(12) United States Patent
Akiyama et al.

(10) Patent No.: US 7,800,358 B2
(45) Date of Patent: Sep. 21, 2010

(54) NONCONTACT ROTATION ANGLE SENSOR, MANUFACTURING METHOD FOR THE SAME, AND THROTTLE VALVE CONTROL DEVICE FOR INTERNAL COMBUSTION ENGINE HAVING THE SAME

(75) Inventors: Yoshiyuki Akiyama, Hitachinaka (JP); Kenji Nakabayashi, Hitachinaka (JP); Hiroshi Onuki, Hitachi (JP); Takatoshi Yamamoto, Hitachi (JP); Katsuhiko Kikuchi, Hitachinaka (JP); Kazuya Ishihara, Kasama (JP)

(73) Assignee: Hitachi, Ltd., Tokyo (JP)

( * ) Notice: Subject to any disclaimer, the term of this patent is extended or adjusted under 35 U.S.C. 154(b) by 825 days.

(21) Appl. No.: 11/478,145

(22) Filed: Jun. 30, 2006

(65) Prior Publication Data

US 2007/0000455 A1    Jan. 4, 2007

(30) Foreign Application Priority Data

Jun. 30, 2005   (JP)   ............................. 2005-192487

(51) Int. Cl.
  *G01B 7/30*   (2006.01)
(52) U.S. Cl. ............................. 324/207.25; 324/207.2

(58) Field of Classification Search .............. 324/207.2, 324/207.25, 251; 123/612, 617; 73/514.16, 73/541.31, 514.39; 338/32 R, 32 H; 702/151
See application file for complete search history.

(56) References Cited

U.S. PATENT DOCUMENTS

| 5,144,234 A | * | 9/1992 | Murata | ........................ 324/235 |
| 5,558,074 A | * | 9/1996 | Fukatsu et al. | .............. 123/647 |
| 6,512,027 B2 | * | 1/2003 | Kanai et al. | .................. 523/511 |

FOREIGN PATENT DOCUMENTS

| JP | 2001-289610 A | 10/2001 |
| JP | 2005-106781 | 4/2005 |
| JP | 2005-147926 A | 6/2005 |

* cited by examiner

*Primary Examiner*—Bot L LeDynh
(74) *Attorney, Agent, or Firm*—Crowell & Moring LLP

(57) ABSTRACT

After the periphery of the magnetic sensitive element is surrounded by an elastic member, the magnetic sensitive element is mold-formed with resin material. Soft epoxy or gel resin is employed as the elastic member, poured in an element-mounting space and solidified. The magnetic sensitive element is surrounded by silicone rubber. Such construction allows the magnetic sensitive element not to be affected by vibration and allows the elastic member to absorb the stress which is created due to the thermal deformation of the molded resin.

10 Claims, 24 Drawing Sheets

NONCONTACT ROTATION ANGLE SENSOR, MANUFACTURING METHOD FOR THE SAME, AND THROTTLE VALVE CONTROL DEVICE FOR INTERNAL COMBUSTION ENGINE HAVING THE SAME

CLAIM OF PRIORITTY

The present application claims priority from Japanese application serial no. 2005-192487, filed on Jun. 30, 2005, the content of which is hereby incorporated by reference into this application.

BACKGROUND OF THE INVENTION

The present invention relates to a sensor for sensing a rotation angle of a rotary object to be sensed, namely, a noncontact rotation angle sensor. More particularly, it relates to a rotation angle sensor which is provided with a magnetic sensitive element for sensing a magnetic flux varying with a rotor rotation and senses the rotor rotation angle in a noncontact manner.

For example, it relates to a rotation angle sensor for sensing a rotation angle of a throttle valve for a gasoline engine or a diesel engine, by using Hall elements, Hall ICs or the like. Also, the present invention relates to a throttle valve control device that is provided with such a rotation angle sensor.

Throttle position sensor using a rotation angle sensor senses a rotation angle of a throttle valve controlling an opening area of an air intake passage of a gasoline automobile, diesel automobile or the like. A conventional throttle position sensor is provided with a rotor section serving as a magnetic flux generating source, at one end of a throttle shaft.

The rotor section is provided with permanent magnets serving as a magnetic field generating source and yokes forming a magnetic passage, at a holder member fixed to the one end of the throttle shaft.

Also, the throttle position sensor is provided with a stator which is provided with a magnetic detecting gap through which the magnetic flux generated by the rotor section passes.

The Hall elements are mounted in the magnetic detecting (passing) gap of the stator.

The amount of the magnetic flux passing through the magnetic detecting gap is adapted to be varied according to the position of the rotor rotating together with the throttle shaft.

Thus, the Hall elements installed in the magnetic detecting gap are adapted to sense the magnetic flux which is varied by the rotation of the throttle shaft.

The Hall elements and a signal processing circuit section are integrally mounted to a resin-made housing to which the stator is fixed, or a cover member. An output from the sensor is supplied to an external unit through an electrical conductor and a connecter section. The conductor is insert-molded with the resin molded-member or cover member by resin-molding, and the connector section is molded together with the resin-made housing or the cover member by resin-molding.

There are Japanese Patent Application Laid-Open No. 2005-147926 and Japanese Patent Application Laid-Open No. 2001-289610 as prior arts related to this invention.

SUMMARY OF THE INVENTION

The present invention solves any of the following problems.

Problem 1: The above-mentioned conventional rotation angle sensor is provided with the magnetic detecting gap for installing the magnetic sensitive element between stator cores comprised of two members. The magnetic sensitive element is installed in the magnetic detecting gap of the stator via a resin-made spacer or via insert molding with resin. However, the resin spacer or the resin for insert molding may be thermally deformed due to a change in temperature rise of a peripheral space in which the stator is installed and, at this time, deformation stress may be applied to the magnetic sensitive element. Consequently, the characteristic of the magnetic sensitive element may vary after prior characteristic adjustment.

Problem 2: The conventional rotation angle sensor is modularized by integrating electric components such as a circuit board, a lead frame (electrical conductor) and the connector with a molded resin. The modularized unit is fixed to a throttle body by screws. However, a driver circuit for a motor is formed as a component separated from the magnetic sensitive element section, so that it is impossible to inspect the magnetic sensitive element or inspect the adjustment in a manufacturing process line while driving the motor by a driver circuit used in an actual product.

Problem 3: A noise killer-capacitor is connected between electrical conductors on their way from the magnetic sensitive element of the rotation angle sensor and an external connection terminal of the connector provided at the resin molded body. There is a possibility that the bonding portions between the capacitor and the electrical conductor become separated by stress produced due to thermal deformation of the molded resin.

Problem 4: Since the conventional rotation angle sensor is provided with the two magnetic sensitive elements, the number of terminals increases. In order to reduce the number of the terminals, it is known that commonality of terminals for a power source and commonality of terminals for a ground source are aimed. However, concrete wiring arrangements of the electrical conductors (power source conductor, ground conductors and signal conductor) and concreter reduction measures of the number of the terminals have not been suggested.

Problem 5: In the prior art, devising of mutual relations among the throttle valve, arc-shape angles of the magnets of the magnetic flux generating device, and the installing positions of the magnetic sensitive elements (magnetic detecting gap), for improving sensitivity of the magnetic rotation angle sensor, have not been known.

Problem 6: In the prior art, measures for preventing characteristic deterioration due to heat generated from the magnets and yokes of the magnetic flux generating device have not been known. Moreover, protection measures against condensation on the surface of the rotor or stator have not been known. When dew drop water from the surface of the rotor or stator is trapped in a space between the rotor and the stator, the water combines with sulfur component contained recirculated exhaust gas, thereby a sulfide is produced. Consequently, corrosion of the rotor or stator or magnetic sensitive elements may be occurred by sulfide.

Problem 7: In the prior art, at the time of insert-molding of the electrical conductors with resin, the positions of the several electrical conductors are hard to be kept and the molding operation takes a troublesome job.

The object of the present invention is to provide a rotation angle sensor capable of solving at least one of the above-mentioned problems.

In order to solve the problem 1, according to the invention according to claims 1 and 2, a periphery of the magnetic sensitive magnets is enclosed by an elastic member that is formed of material different from the resin molded member of the stator.

In order to solve the problem 2, according to the invention according to claims 10 and 11, the motor control circuit and the engine control circuit are integrally mounted together with the magnetic sensitive element section to a resin cover as the resin molded member.

In order to solve the problem 3, according to the invention according to claim 16, the two sides of a chip capacitor bonded between the conductors are surrounded by the same resin.

In order to solve the problem 4, according to the invention according to claim 19, among the electrical conductors, the electrical conductors for the power source and the grounds are formed into a branch on the side of the magnetic sensitive elements and formed into a single on the side of the connector.

In order to solve the problem 5, according to the invention according to claim 24, the magnetic rotation angle sensor is configured that a pair of arc-shaped magnets face each other interposing the stator between those magnets, and that the rotation angle of the object to be sensed becomes maximum or minimum in the vicinity of one ends of the magnets. A line extended along the magnetic sensitive surfaces of each magnetic sensitive element at the respective the rotation angle maximum or minimum position passes close by one end of each arc-shaped magnet. Further, the arc-shape angles of the pair of the yokes are larger than the arc-shape angles of the magnets.

In order to solve the problem 6, according to the invention according to claim 26, one surfaces of the yokes and magnets in the magnetic flux generating device which is insert-molded by the resin molded-member are exposed at the sensor interior space. Also, a through-hole for communicating between the inner and outer peripheries of the resin insert-molded rotor with a cylindrical shape is provided in the rotor.

In order to solve the problem 7, according to the invention according to claim 30, when making the noncontact rotation angle sensor, at least two of electrical conductors for the sensor is insert-molded in the resin molded member in a condition where the electrical conductors are not yet separated from each other. And then, cutting an junction point of the electrical conductors after said insert-molding is executed, the electrical conductors is electrically allowed to be independent from each other.

DETAILED DESCRIPTION OF THE INVENTION

Embodiments of a noncontact rotation angle sensor according to the present invention will be described in detail hereinafter with reference to FIGS. 1 to 27.

Embodiment 1

Referring to FIGS. 1 to 10, a motor-driven throttle valve controlling device for a gasoline engine in which a noncontact throttle position sensor is used for a rotation angle sensor according to the present invention, will be concretely discussed hereinafter.

Figure 1:
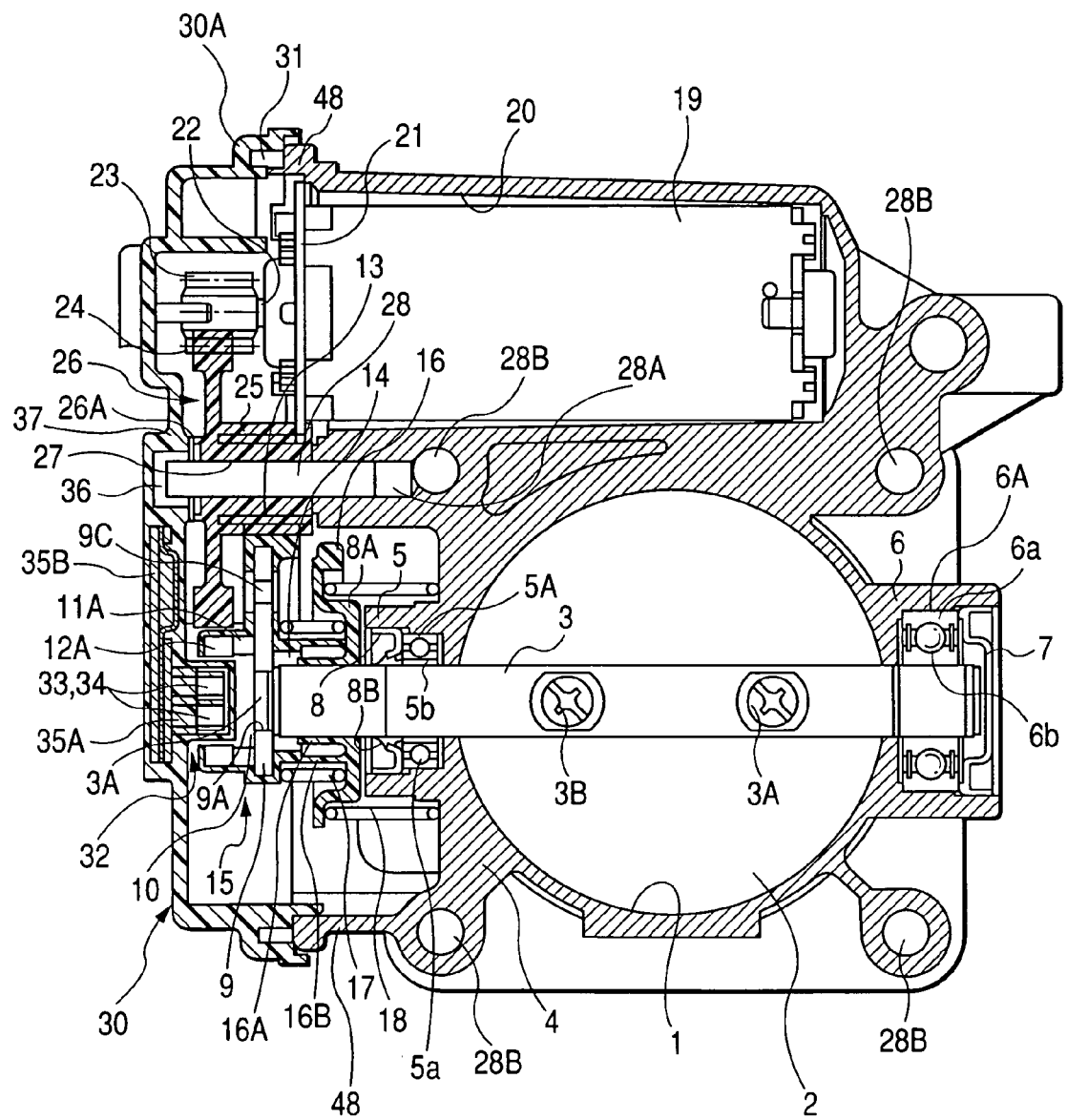
FIG. 1 is a sectional view showing a first embodiment in which the rotation angle sensor according to the present invention is used in the throttle control device for the gasoline engine.
Figure 2:
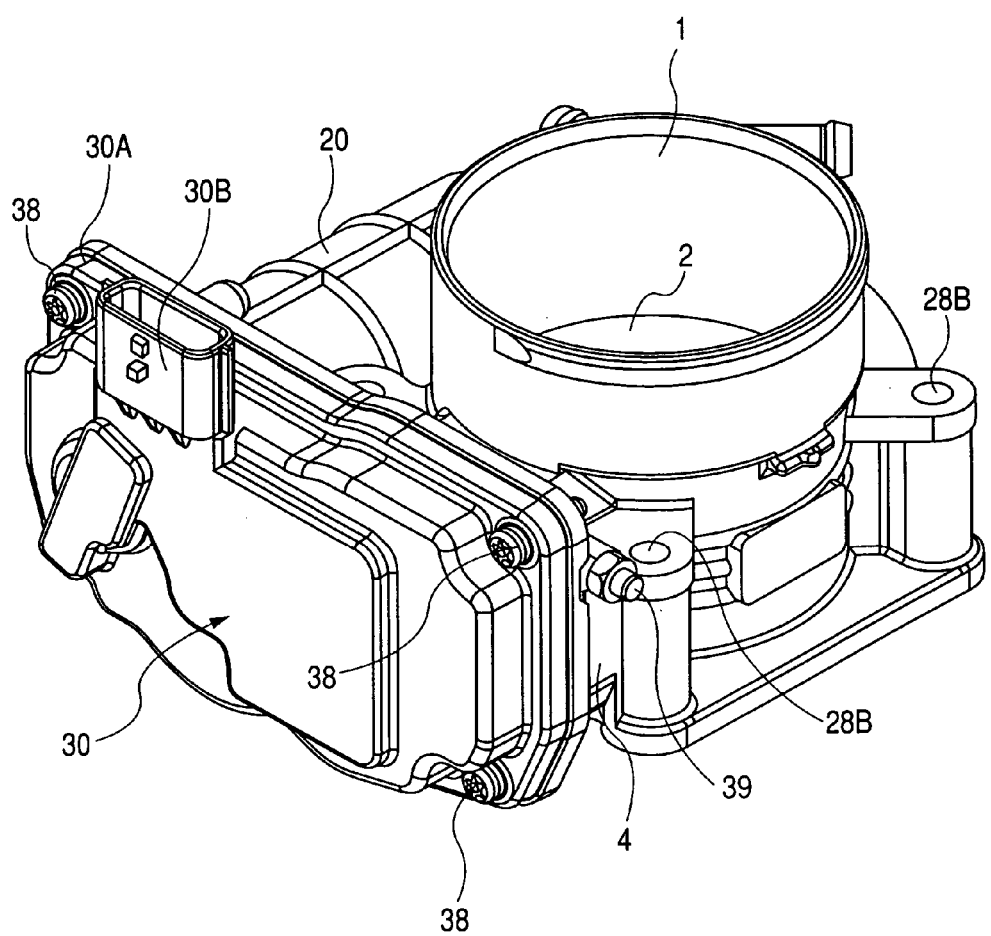
FIG. 2 is a schematic perspective view of the first embodiment.
Figure 3:
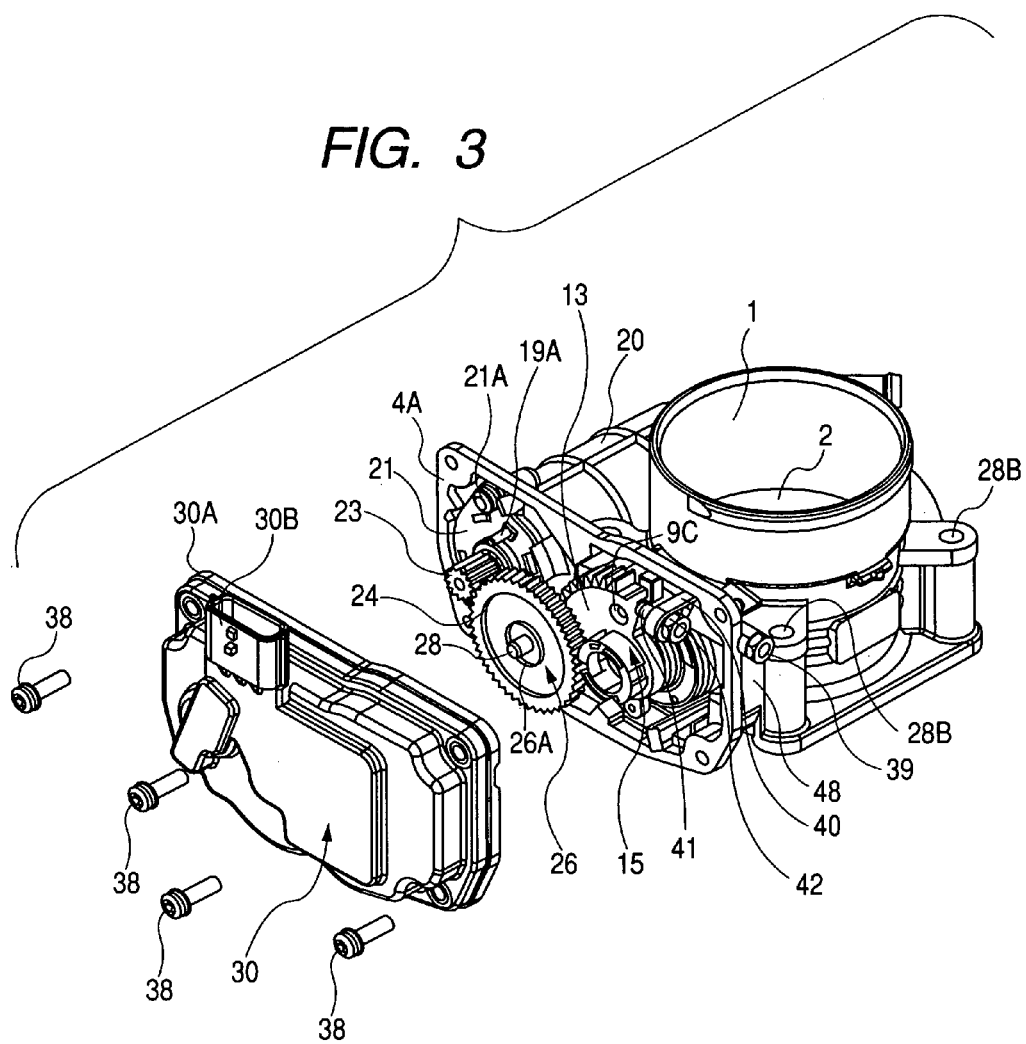
FIG. 3 is a perspective view of the first embodiment in which the resin cover is removed.
Figure 4:
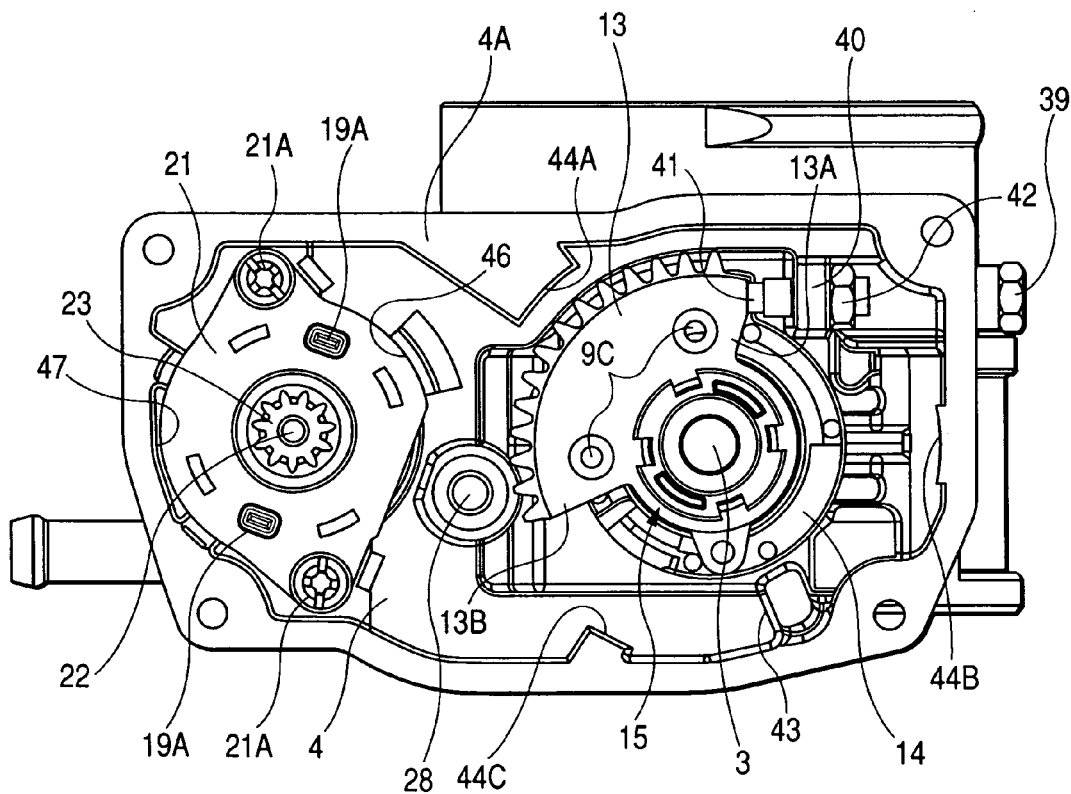
FIG. 4 is a side view of the first embodiment in which the resin cover is removed.
Figure 5:
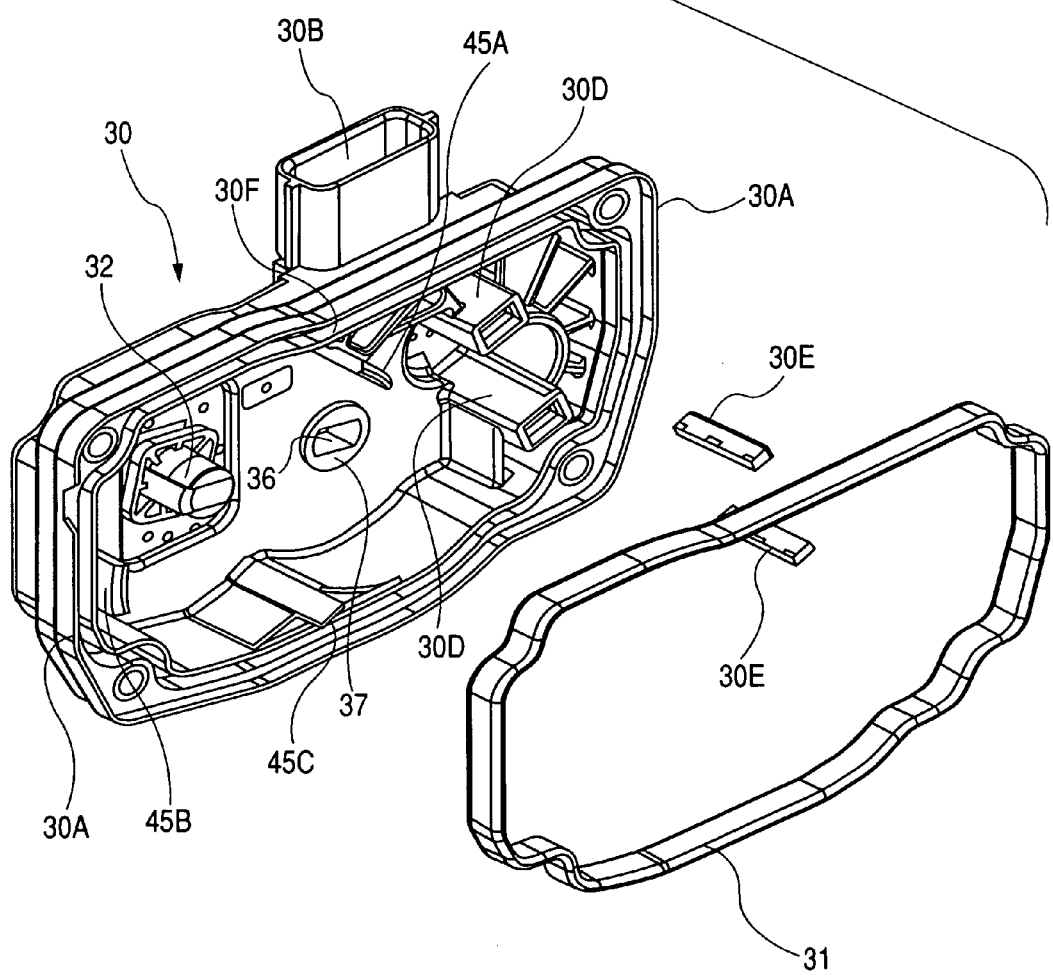
FIG. 5 is a perspective view showing the inner side of the resin cover in the first embodiment.
Figure 6:
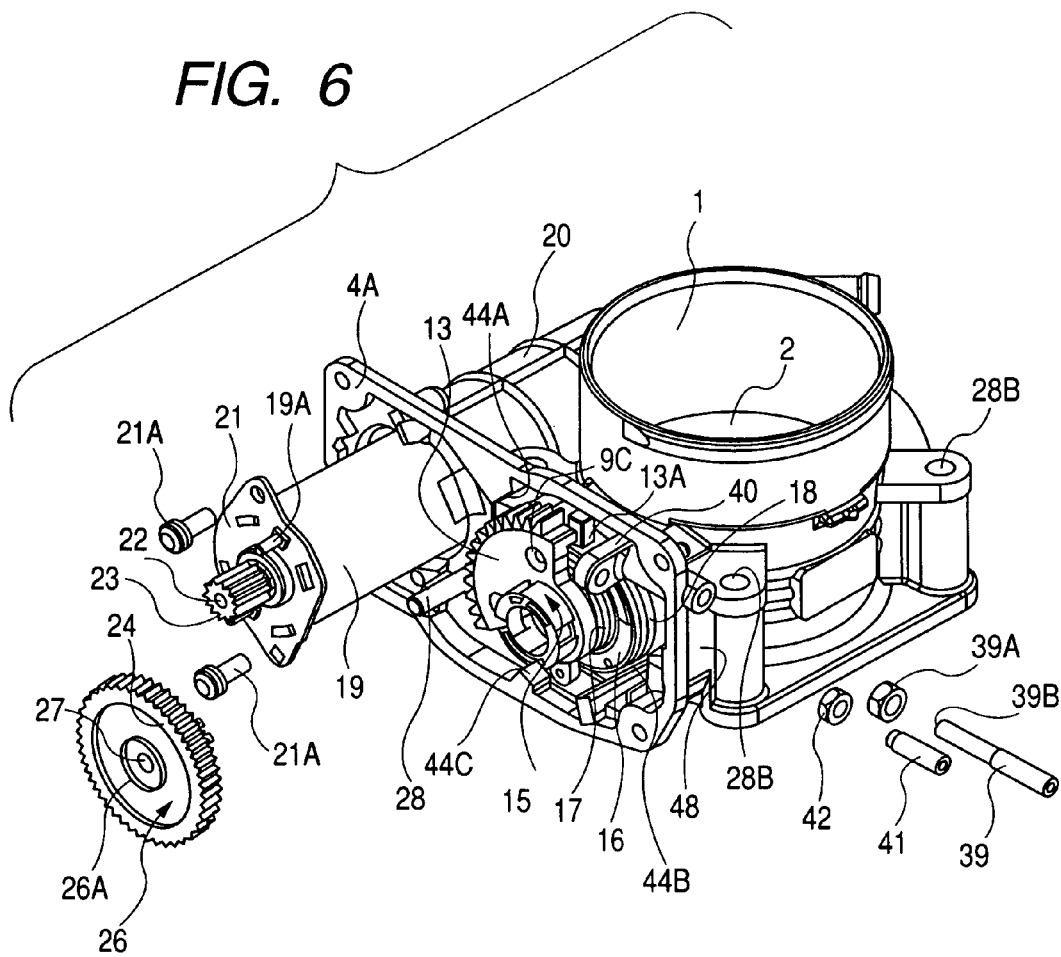
FIG. 6 is an exploded perspective view of assistance in explaining a condition where the motor is assembled in the first embodiment.
Figure 7:
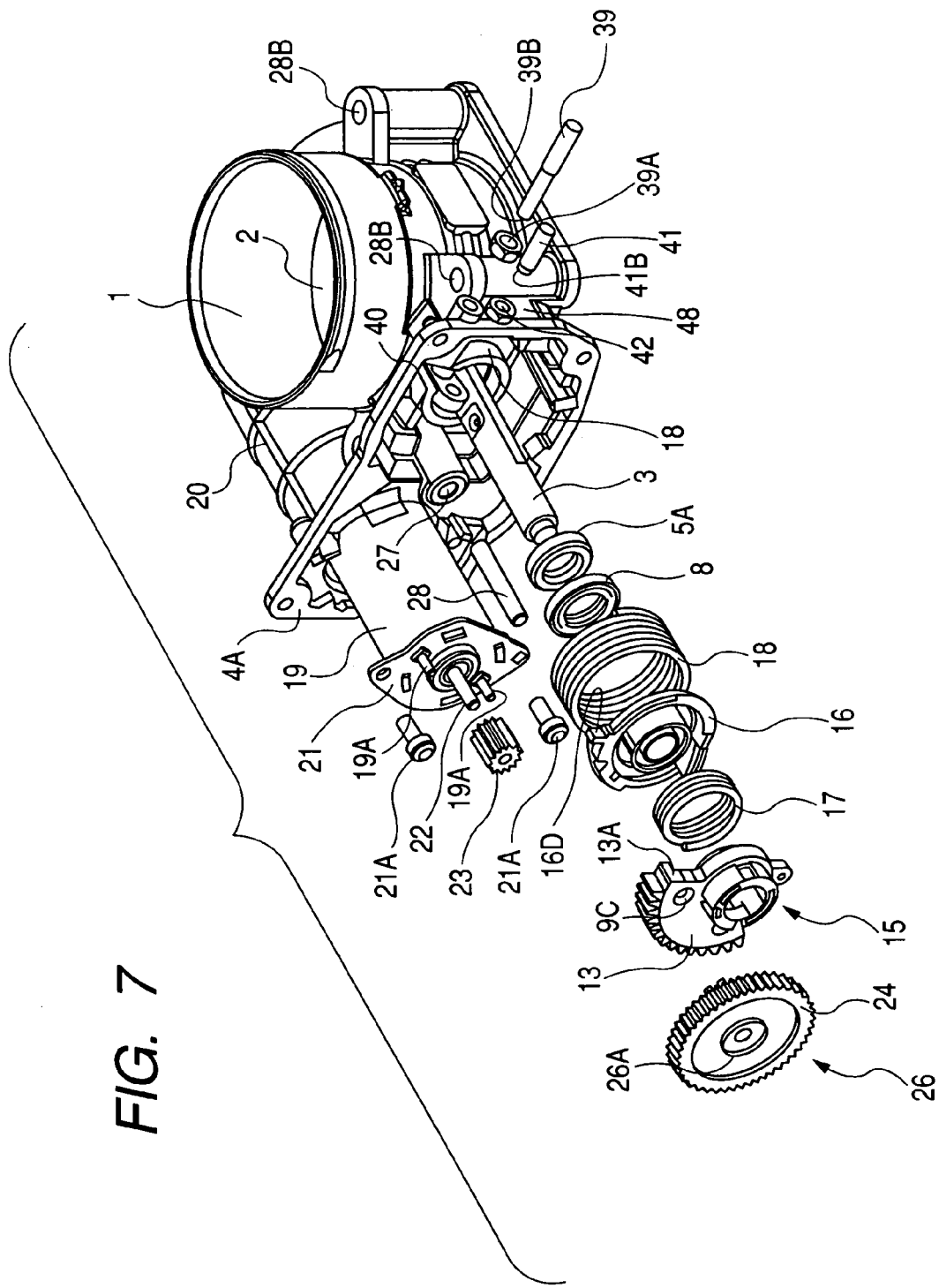
FIG. 7 is an exploded perspective view of the first embodiment.

FIG. 1 is a sectional view showing a main section of the motor-driven throttle valve controlling device. Parts which are not shown in FIG. 1 are shown in FIGS. 2 to 10.

The motor-driven throttle valve controlling device is provided with a bore 1 constituting a part of an air intake passage of an internal combustion engine, and a throttle valve 2 rotatably installed in the bore 1.

The throttle valve 2 is fixed to a throttle shaft 3 by screws 3A, 3B. The throttle shaft 3 is provided across the bore 1 and is rotatably supported to a throttle body 4 forming the bore 1.

The device according to this embodiment has ball bearing-type bearings 5A, 6A whose outer rings 5a, 5b are press-fitted in bearing-installing boss portions 5, 6 of the throttle body 4. The throttle shaft 3 is rotatably supported to the throttle body 4 by allowing the throttle shaft 3 to be press-fitted in inner rings 5b, 6b of the bearings 5A, 6A.

An opening of the bearing-installing boss portion 6 is sealed by a cap 7. Thereby air ingress into the bearing 6A, air leakage from the bearing 6A are prevented and lubricating grease leakage from the bearing 6A is prevented.

A seal device 8 is provided at an end of the bearing 5A. The seal device 8 is provided with a ring-shaped retainer portion 8A which is fixed to the boss portion 5 by press-fitting the retainer portion 8A into an internal periphery of the boss portion 5. A seal member 8B is supported by a ring-shaped portion which is arranged around an inner periphery of the retainer portion 8A. The retainer portion 8A is provided with two lip seal portions contacting with an outer periphery of the throttle shaft 3 at two portions in an axial direction.

By the above-mentioned structure, air leakage from the air intake passage through the bearing is prevented. Also, lubricating grease for the bearing 5 is prevented from being splattered into a space in which a sensor described later is installed.

A pair of arc-shaped magnets 11A and 11B are disposed on a flat surface of a metal plate 9 of magnetic material. A pair of arc-shaped yoke 12A and 12B are disposed adjacent to the magnets 11A and 11B so that the magnets 11A and 11B are sandwiched between the yoke 12A (12B) and the metal plate 9. The magnets and the yoke are integrated into a single assembly by insert-molding with a resin cover-material. FIG. 1 is a sectional view of the main section, taken at a location at which an arc-shaped end of one 11A of the magnets and an arc-shaped end of one 12A of the yoke are visible.

Figure 8:
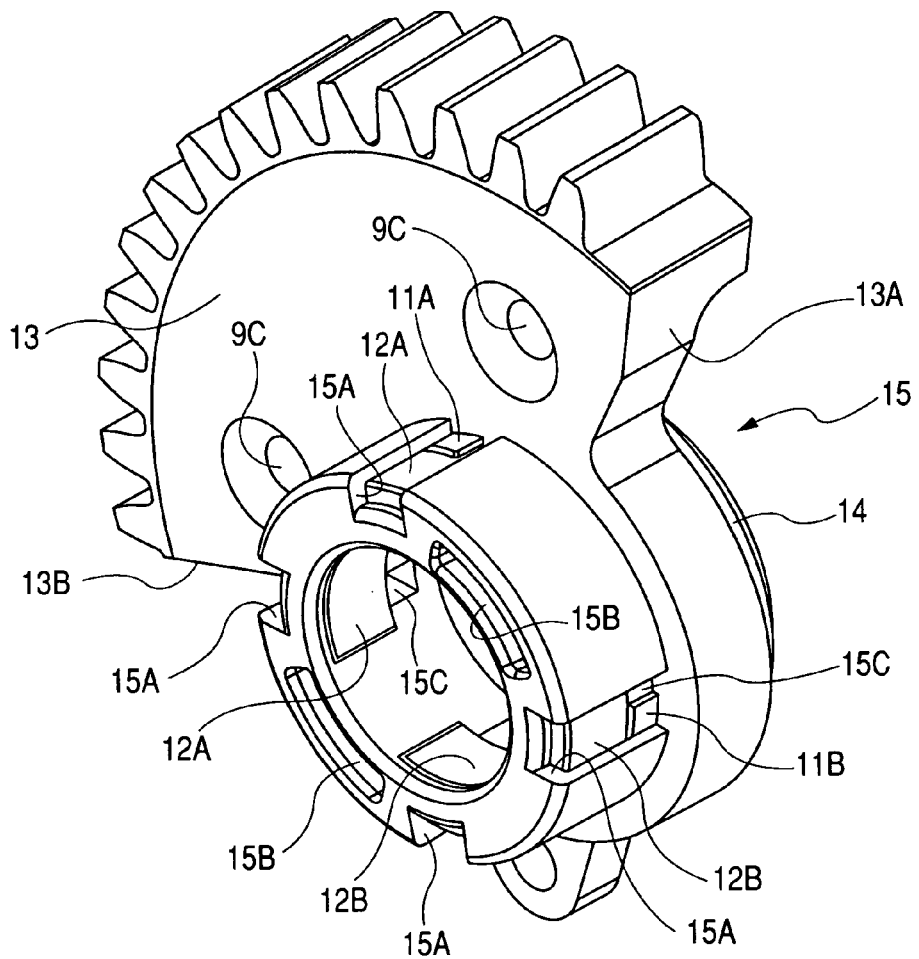
FIG. 8 is an enlarged perspective view of the rotor section of the first embodiment.
Figure 9:
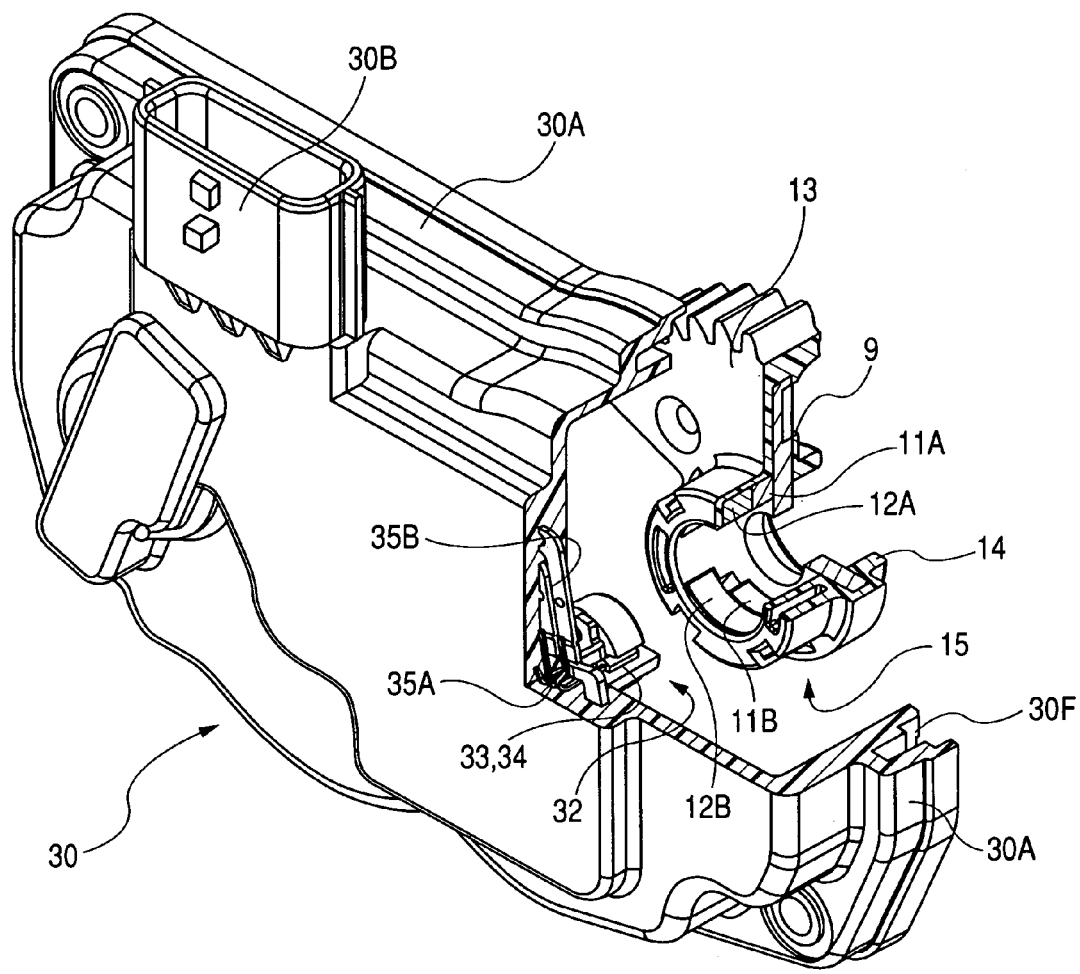
FIG. 9 is a partially cutaway perspective view of the resin cover of the first embodiment.
Figure 10:
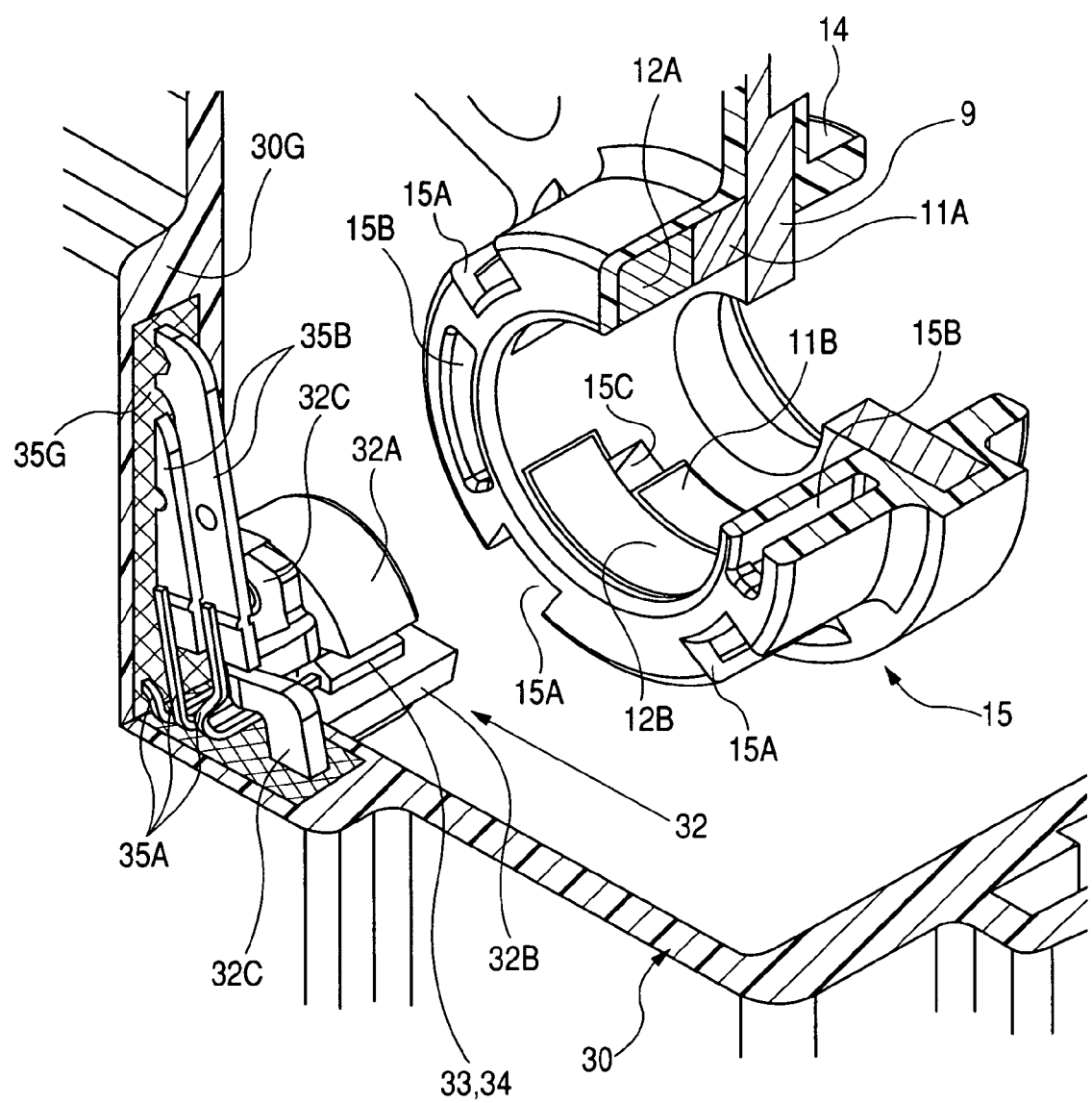
FIG. 10 is a partially cutaway, enlarged perspective view of the throttle position sensor section of the first embodiment.

In this embodiment, as shown in detail in FIGS. 8 to 10, a throttle gear 13 is also molded of the above-mentioned resin material and is integrated into a single assembly together with the metal plate 9, the magnets 11A, 11B and the yokes 12A, 12B.

Furthermore, a spring-bearing sleeve 14 is molded of the same resin material integrally with the metal plate 9.

Thus, a rotor section 15 of a rotation angle sensor (a non-contact throttle position sensor) described later is configured by the resin-throttle gear 13, the magnets 11A, 11B, the yokes 12A, 12B, and the spring-bearing sleeve 14.

One end 3A of the throttle shaft 3 is inserted into an insertion hole 9A of the metal plate 9 and circularly welded to the metal plate 9 by laser beam welding 10 at a region at which an outer peripheral surface of the axial end 3A of the throttle shaft 3 and an inner peripheral surface of the insertion hole 9A are adjacent to each other. Thereby the rotor section 15 is connected to the end of the throttle shaft 3.

A spring retainer 16 made of resin material is installed on the periphery of the throttle shaft 3 with a loose fit between an axial end of the bearing-mounting boss 5 and the rotor section 15.

The spring retainer member 16 has a sleeve portion 16A formed inside thereof, and the sleeve portion 16A is adjacent to the throttle shaft 3. This sleeve portion 16A is useful in allowing the spring retainer member 16 to be kept in concentric condition relative to the throttle shaft 3.

Furthermore, the spring-retainer member 16 has a sleeve portion 16B outside the sleeve portion 16A, and the sleeve portion 16B has a diameter identical to or nearly identical to that of the spring-bearing sleeve 14 of the rotor section 15.

The diameter of the sleeve 14 and the diameter of the cylindrical sleeve portion 16B are designed so as to be substantially identical to each other. They serves as a sleeve for holding a default spring 17 comprised of a coil spring installed around them.

The default spring 17 is formed at one end thereof with a hook portion. The hook portion 17 is hooked into a recess portion of the rotor section 15 so as to restrain in a rotational direction of the throttle shaft. Also, the default spring 17 is formed at the other end thereof with a hook portion. The hook portion is hooked into a notch of the spring-retainer member 16 so as to restrain in the rotational direction.

As a result, when the throttle shaft is allowed to rotate toward a fully closed valve position, the following motion is done. That is, a stopper-contact portion 16D of the spring-retainer member 16 (shown in FIG. 7) comes into contact with a stationary end 39B of a default stopper 39 (shown in FIG. 17), and the rotation of the spring-retainer member 16 is stopped. Thereafter, while leaving the spring-retainer member 16 at the default stopper, the throttle shaft 3 is further rotated in such a direction as to allow a throttle valve 2 to be closed. In this status, the default spring 17-one end hooked with the spring-retainer member 16 serves as a stationary end, whereas the other end hooked with the rotor section 15 serves as a movable end. Thereby the default spring 17 is further twisted around the sleeve portion 14 and the sleeve portion 16B, so that the default spring 17 is tightly contacted with the peripheries of the sleeve portion 14 and sleeve portion 16B. At this time, even if the sleeves both are contacted with the default spring 17 and slide relative to the default spring 17, such large friction as to affect the property of the default spring 17 is not produced, because the sleeves both are made of resin. Moreover, the outer diameters of the sleeves are substantially identical to each other, so that it is hard to make partial contact of the sleeves with respect to the default spring, and it is possible to prevent circumferential edges of a butted portion of those sleeves from locally contacting with the default spring. Therefore, it is hard to occur unbalanced wearing away of the sleeves.

In a condition where the throttle valve 2 is controlled so as to be set to any opening degree-angle between a full-closed position and a default position, when a rotation torque by a motor is lost for some reason, the default spring 17-one end hooked with the rotor section 15 works as an action point to apply a spring force of the default spring 17 to the throttle shaft. Thereby the throttle shaft 3 allows the throttle valve 2 to be opened to the position 39B of the default stopper 39. When the throttle valve 2 is located at a default opening degree position, the amount of air which allows an automobile to be self-traveled at a low speed (approximately 40 km/h in Japan, and approximately 80 km/h in foreign countries) can be obtained.

Moreover, when the engine is stopped, the throttle valve 2 is also opened to the default position. As a result, there is no possibility that the throttle valve will be stuck to an inner wall surface of the bore 1 by contamination, freezing orbiting during the engine stop. Therefore, the throttle valve is smoothly opened to the opening degree required by the engine at start-up, or is smoothly closed, whereby the amount of air can be smoothly controlled.

A return spring 18 is disposed between the spring-retainer member 16 and the throttle body 4.

The diameter of the return spring 18 is larger than that of the default spring 17. Moreover, the diameter of the return spring 18 is designed so as to be larger than the outer periphery of the bearing-installing boss portion 5.

The return spring 18 is formed at one end thereof with a hook portion which is hooked into a notch of the spring-retainer member so as to be restrained in the rotational direction. The return spring 18 is also formed at the other end thereof with a hook portion which is hooked into a recess portion formed in the throttle body so as to be restrained in the rotational direction.

In the spring-retainer member, a default spring 17-retainer part on an inner side thereof, and a return spring 18-retainer part on an outer side are configured by respective circular recess portions which are disposed concentrically, lapped with each other in an axial direction, and formed in mutually opposite directions. Therefore, although the two springs are axially disposed in series, the total length of those springs' layout is shorter than the sum of the lengths of the two springs. Moreover, the spring-retainer member 16 is designed such that the outer diameter of the cylindrical portion thereof facing an inner peripheral portion of the return spring 18 is larger than the outer diameter of the bearing-installing boss portion 5. Thereby, even when the return spring 18 is further twisted and the outer diameter of the return spring 18 then becomes small, the return spring 18 only comes into contact with the surface of the resin-made spring-retainer member 16 but not come into contact with a metallic region of the bearing-installing boss portion 5. Accordingly, even if the return spring 18 and the bearing-installing boss portion 5 are rubbed against each other, such large friction as to badly affect the action property of the return spring 18 is not produced. Moreover, the generation of metallic abrasion powders is reduced.

In the condition where the throttle valve 2 is controlled so as to set to any opening degree angle between the full-open position and the default position, when the rotation torque by the motor 19 is lost for some reason, the return spring 18-hook portion hooked with the throttle body 4 works as an stationary end, whereas the return spring 18-hook portion hooked with the spring-retainer member 16 works as an action point to apply a spring force of the return spring 18 to the throttle shaft. Thereby, the throttle shaft 3 and the throttle valve 2 are rotated up to the one end position 39B of the default stopper 39. Therefore, even if the motor can not be energized for some reason, the default opening degree is obtained and the self-traveling of the automobile is possible.

The axial set load of the return spring 18 is applied in such a direction as to cause the spring-retainer member 16 to be moved away from the throttle body 4. As a result, since a small gap is maintained between the facing ends of the spring-retainer member 16 and bearing-installing boss portion 5, friction at this region is reduced. Therefore, the generation of such friction as to badly affect the operating characteristic of the return spring 18 is reduced.

The set load of the return spring 18 produces a force pressing the spring-retainer member 16 against the rotor section 15. Therefore, the sleeve 16B of the spring-retainer member 16 appears to be pressed and rubbed against the sleeve 14 of the rotor section 15. However, in this embodiment, the set load of the default spring 17 acts so as to cause the spring-retainer member 16 to be separated from the rotor section 15, so that consequently contact force between the sleeve 16B and the sleeve 14 is reduced and such wear that can be a problem will not be generated.

When the throttle shaft 3 rotates in such a direction as to open the throttle valve from the default position, an engaging portion provided at the rotor section 15 is operatively engaged with the spring-retainer member 16, so that the spring-retainer member 16 is rotated together with the throttle shaft. As a result, the return spring 18-hook portion hooked to the throttle body 16 becomes a stationary point, whereas the return spring 18-hook portion hooked to the spring-retainer member 16 becomes an action point, and the return spring 18 is twisted around the outer periphery of the return spring installing cylindrical portion of the spring-retainer member 16. But in this situation, the return spring comes into little contact with the outer periphery of the bearing-installing boss portion 5.

The set load of the return spring 18 in axial direction exerts the rotor section 15 in such a direction that the rotor section 15 is moved away from the throttle body 4. Consequently, the displacement of the rotor section 15 in a thrust direction is restrained and the positional relationship of the rotor section 15 with respect to a sensor section described later can be stabilized and the sensing accuracy of the sensor can be improved.

The metallic plate 9 is formed with a positioning hole 9C. When the one end portion 3A of the throttle shaft 3 is inserted into the insertion hole 9A of the metallic plate 9, the rotor section 15 is fixed on the throttle shaft 3 while relating the installing position of the rotor section 15 to the opening degree position of the throttle valve 2 on the throttle shaft 3. Therefore, the opening degree position of the throttle valve 2 and the position of the rotor section 15 are determined relative to the positioning hole 9C as a reference position.

The throttle body 4 is formed by an aluminum die casting process, and a casing part 20 for housing the motor 19 is formed integrally together with the throttle body 4. The casing part 20 is formed with an internal taper whose internal diameter gradually becomes small toward the far side thereof. Thereby the motor 19 is easy to be inserted in the casing portion 20. After the motor 19 is inserted in the casing portion 20, a peripheral wall of the motor 19 is elastically contacted with an inner wall of the casing portion 20, whereby vibration of the motor is restrained.

A mounting flange 21 which doubles as an end bracket is fixed to an end of the motor 19 and is fixed, via two screws 21A, onto a surface of the throttle body 4 formed around an opening region of the casing portion 20.

Two connecting terminals 19A of the motor 19 penetrate through the flange 21 and project toward a resin cover 30. The terminal-socket portion 30D to which the two terminals are to be connected is resin molded integrally together with the cover 30.

Two pin terminals are provided within the terminal-socket portion 30D, and they are respectively inserted into one ends of two intermediate terminals 30E having female terminals provided at both ends thereof. The connecting terminals 19A of the motor 19 are inserted into others of female terminals of the intermediate terminals 30E.

The intermediate terminals 30E having such a structure is capable of absorbing deviation between the position of the terminal-socket portion 30D and the position of the motor connecting terminals 19A when connecting them. The inserting of the terminals accordingly can be carried out without visual check and, therefore, the resin cover 30 can be automatically mounted on the throttle body.

A first gear 23 made of metal is fixed to a rotary shaft 22 of the motor 19.

A second gear 24 meshed with the first gear 23 is made of resin material. A third gear 25 which has a diameter smaller than that of the second gear 24 is formed integrally together with the second gear 24. The second and third gears both constitute an intermediate gear 26.

The third gear 25 of the intermediate gear 26 is meshed with the throttle gear 13, whereby a reduction gear mechanism as two-stage reduction for the motor 19 is configured. Thus, the torque of the motor 19 is amplified in a two-stage sequence and then transmitted to the throttle shaft 3.

Therefore, change in an opening degree of about 90° from the full-open position to the full-close position of the throttle valve 2 can be achieved in about 80 ms (millisecond) The intermediate gear 26 is provided with a through-hole 27 at a central portion thereof, and a stationary shaft 28 press-fitted in the throttle body 4 is inserted into the through-hole 28. The intermediate gear 26 is rotatably supported by the stationary shaft 28. A hole 28A for press-fitting the stationary shaft 28 is bored previously so that an inmost end of the hole communicates with a bolt mounting through-hole 28B. A bolt for fixing the throttle body 4 to the internal combustion engine is inserted into the bolt mounting through-hole 28B. When the stationary shaft 28 is press-fitted into the hole 28A, air within the hole 28A is released into the atmosphere via the through-hole 28B. Thereby, the stationary shaft 28 can be easily press-fitted without compressing the air within the hole 28A. For example, a press-fitting force can be reduced to about one-tenths.

The resin cover 30 is attached on the throttle body 4 by four screws 38 interposing between the cover 30 and the throttle body 4. The seal member 31 is fitted in a groove 30F which is formed in a frame portion 30A constituting a peripheral wall of the resin cover 30. The seal member 31 is brought in tight contact with a mating surface 4A of the throttle body 4. The mating surface 4A is mated with the frame 30A of the resin cover 30, and the sealing effect is obtained with the seal member 31.

The stator section 32 of the magnetic sensor is fixed in the resin cover 30 by resin-insert molding. Hall ICs 33, 34 are installed in the stator section 32.

The Halls ICs 33, 34 are electrically connected with a connector 30B in connecter housing resin molded together with the resin cover 30 via hall ICs' terminals 35A and electrical conductors 35B which are provided by insert molding.

In the condition where the resin cover 30 is attached on the throttle body 4, the stator section 32 is inserted in a central region between the pair of the ark-shaped yokes 12A (12B), and the outer periphery of the stator section 32 and the inner peripheries of the yokes 12A (12B) are faced to each other with a small gap between them.

A magnetic flux generated by the magnet 11A passes the metallic plate 9, then passes the yoke 12B, together a magnetic flux generated by the other magnet 11B, crosses the gap and the stator 32, reaches the other yoke 12A, and then returns to the magnet 11A.

When the rotor section 15 is rotated together with the throttle shaft 3, whereby a positional relationship between magnetic sensitive surfaces of the Hall ICs 33, 34 and the yokes 12A, 12B is varied. Thus, the magnetic flux passing through the magnetic sensitive surfaces of the Hall ICs 33, 34 can be varied. The Hall ICs 33, 34 detect the magnetic flux variation and output electrical signals corresponding to the magnetic flux. The electrical signals correspond to a rotation angle of the throttle shaft 3, namely, the opening degree angle of the throttle valve 2.

The resin cover 30 has a recess portion 36 resin molded together therewith. The recess portion 36 is located at a portion facing one end of the stationary shaft 28. An annular protrusion 37 is formed around the recess portion 36 so as to slightly project from an inner wall of the resin cover 30. The one end of the stationary shaft 28 is inserted into the recess portion 36. An annular protrusion 26A, which is formed at a central portion on a surface of the intermediate gear 26, faces the annular protrusion 37.

Between those protrusions, there is provided a gap. Those protrusions are prevent the resin-made intermediate gear 26 from being moved in the thrust direction along an axis of the stationary shaft 28. As a result, there is no possibility that the first and second gears 23, 24 are disengaged from each other at meshing portions-thereof, or that meshing-failure between the first and second gears 23, 24 occurs (incidentally, the meshing-failure occurs when the second gear moves over the end of the first gear in the thrust direction and the second gear bites an edge of the end of the first gear).

Moreover, shock noise, which is produced by collision between the wall surface of the throttle body 4 and the intermediate gear 26 and by collision between the intermediate gear 26 and the inner surface of the resin cover 30, can be minimized.

The throttle gear 13 is formed as a sector wheel of about 110 degrees. This shape is based on the ground that the rotation angle of the throttle valve 2 is about 90 degrees. One side edge 13A of the sector shaped gear 13 serves as a stopper-contact portion caught by one end 41B of a full-close stopper 41 at the full-close position.

The full-close stopper 41 is comprised of an adjusting screw. The adjusting screw (stopper) 41 is screwed into a threaded protrusion portion 40 which protrudes from the wall surface of the throttle body 4 to a position adjacent to the throttle gear 13 along the bearing-installing boss portion 5. The protrusion portion 40 is formed integrally with the throttle body 4 by aluminum die casting.

Under usual vehicle travel-control condition (namely under controlling the throttle valve), although the stopper-contact portion 13A of the throttle gear does not come into contact with the full-close stopper 41, it is allowed to come into contact with the full-close stopper 41 by controlling the motor 19 in the following situation.

That is, since the full-close position of the throttle valve is a reference position on the throttle valve control, leaning the full-close position is needed to recognize the reference position in advance of controlling the throttle valve. In order to learn the reference position, the throttle gear 13 is rotated until the moving stopper 13A comes into contact with the full-close stopper 41 by motor controlling at the time of starting or stopping of the engine. At this time, an output value of a sensor (Hall IC) is memorized as a reference full-close position. The full-close stopper 41 such as the adjusting screw is adjusted, then is tightly fastened with a lock nut 42, and sealed by lock paint.

The other side edge of the sector-shaped gear as the throttle gear 13 serves as a stopper-contact portion that comes into contact with a full-open stopper 43 at a full-open position of the throttle valve 2.

The full-open stopper 43 is comprised of a wall surface which is formed integrally with the throttle body 4 by aluminum die casting. The position of the full-open stopper is not adjusted (none-adjustment).

The default stopper 39 is comprised of an adjusting screw which is screwed into the frame portion 48 of the throttle body 4 from the outside. The frame portion 48 is formed integrally with the throttle body on the side wall of the throttle body, and the default stopper position of the frame portion faces the spring-retainer member 14.

The full-close stopper 41 is arranged at the position facing one side edge of the throttle gear 13, whereas the default stopper 39 is arranged at the position facing the outer periphery of the spring-retainer member 16.

The default stopper 39 is located at a position closer to the air intake passage than the full-close stopper 41. An adjusting screw head of the default stopper 39 and a screw head of the full-close stopper 41 is arranged in parallel Therefore, it is possible to adjust the both adjusting screws from the same direction and it is easy to carry out the adjusting operation.

When the resin cover 30 is attached on the throttle body 4, the full-close stopper 41 is covered with the resin cover 30, whereas the screw head of default stopper and a lock nut 39A are located outside the frame 48 and resin cover 30. Therefore, the position of the default can be adjusted even after the attaching the resin cover 30. Consequently, even after the full-close stopper 41 is adjusted and the full-close position is determined, a default opening degree can be adjusted to demands of the engine.

Three positioning wall surface portions 44A, 44B, 44C are formed integrally with the throttle body 4 so as to surround the throttle shaft 3. Also, three protrusions are formed on the resin cover 30 and located at some positions that face the positioning wall surfaces 44A, 44B, 44C. Outer surface of the protrusions are formed as positioning wall surfaces 45A, 45B, 45C.

When the resin cover 30 is attached onto the throttle body 4, positioning wall surfaces 45A, 45B, 45C of the three protrusions provided on the resin cover 30 come into contact with the positioning wall surfaces 44A, 44B, 44C of the throttle body 4 and are guided, whereby centering of the stator section 32 and the rotor section 15 is carried out. By carrying out the guiding at the three regions in this way, further precise centering of the stator section 32 and the rotor section 15 is achieved.

A guide 46, which serves as means to guide the flange 19A of the motor 19 at the time of mounting of the motor, is formed integrally with the throttle body 4 by aluminum die process. The guide 46 is located at an intermediate position between two screws 21A for fixing of the flange 19A. Also, another guide 47 is formed on the frame 48 of the throttle body 4 in such a manner that both guides 47, 46 are located on opposite sides of the first gear.

The motor 19 can be inserted easily into the motor casing 20 because the inner periphery of the motor casing 20 is formed in such a manner that an insertion opening thereof is relatively wide and the internal diameter thereof becomes smaller toward a far side of the casing. In spite of the fact that the motor casing has such a wide insertion opening, a motor rattle at the time of inserting the motor 19 into the casing 20 can be prevented with the guides 46 and 47. Thereby, smooth assembling of the motor 19 to the casing 20 is ensured. Further, the motor rattle after housing the motor 19 into the case also can be prevented with the flange guides, so that tightening of screws for fixing the motor can be automatically carried out. As a result, full-assembling of the motor to the casing can be carried out by automation.

Resin-molding of the rotor section 15 will be discussed in more detail hereinafter.

The pair of the arc-shaped yokes 12A, 12B facing each other is arranged on the surface of the metallic plate 9 in such a manner that the pair of the arc-shaped magnets 11A, 11B are interposed between the metallic plate 9 and the arc-shaped yokes 12A, 12B.

The arc angle of each magnet is about 85 degrees angle and the arc angle of each yokes is 110 degrees angle. After resin-molding the rotor section 15, the rotor section 15 looks like a cylindrical shape as a whole, but the structure of the magnets and the yokes is not necessarily like a cylindrical shape. If consideration is given to the fact that the rotation angle of the throttle valve is 90 degrees, enough magnetic flux is required to be supplied to the stator within the range of 90 degrees. Therefore, it is unnecessary to cause the arc angle of the magnets and yokes to be increased over this degree. Thus, a good-precision rotation angle sensor can be constructed by magnets and yokes which are made as small as possible.

One of the magnets is magnetized from the metallic plate 9 toward the yoke along an axis of the rotating shaft, namely, in a vertical direction. The other of the magnets is magnetized from the yoke toward the metallic plate 9. Thus, the magnetic flux produced by the magnets is supplied to the yokes so as not to be wasted and larger magnetic flux can be supplied through the gap between the yokes and the stator. Any part to be a magnetic resistance is not present on the metallic plate, so that the entire surface of the metallic plate is used as a magnetic path. In this respect, the magnetic flux produced by the magnets can be also effectively supplied to the stator.

In molding processes of the rotor section 15, a cylindrical formwork (core) for positioning inner peripheral surfaces of the magnets and yokes is set at the center between the arc-shaped magnet 11A, arc-shaped yoke 12A and the arc-shaped magnet 11B, arc-shaped yoke 12B facing each other. Formworks for positioning outer periphery surfaces of those magnets and yokes are set on both of the outer peripheries of the arc-shaped magnet 11A and arc-shaped yoke 12A, and on both of the outer peripheries of the arc-shaped magnet 11B and arc-shaped yoke 12B. Formworks for positioning those magnets and yokes in a vertically direction are set at the same position as the form works for positioning the outer periphery surfaces. Formworks for positioning those yokes in a circumferential direction are set between the arc-shaped yoke 12A and the arc-shaped yoke 12B. Formworks for positioning those magnets in a circumferential direction are set between the arc-shaped magnet 11A and arc-shaped magnet 11B.

In this condition, resin is injected into a forming apparatus and the magnetic flux generating portion is resin molded together with the gear 13.

A condition in which those formworks are removed after hardening of the resin is shown in FIG. 8.

The inner surfaces of the arc-shaped magnet 11A, the arc-shaped yoke 12A, the arc-shaped magnet 11B, and the arc-shaped yoke 12B are respectively exposed to the inner side. Four recess resin portions 15A are formed on the outer periphery of the yokes and magnets. At the recess resin portions 15A, the outer peripheries of the arc-shaped magnet 11A, the arc-shaped yoke 12A, the arc-shaped magnet 11B, and the arc-shaped yoke 12B are exposed to the outside.

Moreover, four through holes 15C, which are formed through a cylindrical resin molded body of the rotor section, are disposed at the both sides of the magnets 11A, 11B.

Moreover, circumferential arc-shaped holes 15B are formed between the yokes of the cylindrical resin molded body. At those holes 15B, circumferential ends of the yokes are exposed.

The stator section 32 is inserted into the cylindrical rotor section 15 and combined with the rotor section. In such an arrangement, air ventilation between inside and outside of the cylindrical of the rotor section 15 can be facilitated via the through holes 15c. Accordingly, the Hall ICs provided at the stator are cooled by air flow, adverse effect which is exerted on the property by temperature rise can be reduced.

Moreover, dew condensation, which is produced on the outer surface of the stator and the inner surfaces of the yokes and the magnets, is smoothly discharged to the outside through the through holes 15C, so that there is no possibility that the stator and the yokes will be corroded by water. Further, when the throttle valve is controlled, since the throttle shaft is frequently rotated, hollowed portion such as the through holes, recesses and arc-shaped holes provided to the rotor section agitate air. Thereby, a heat radiating effect is produced.

Figure 11:
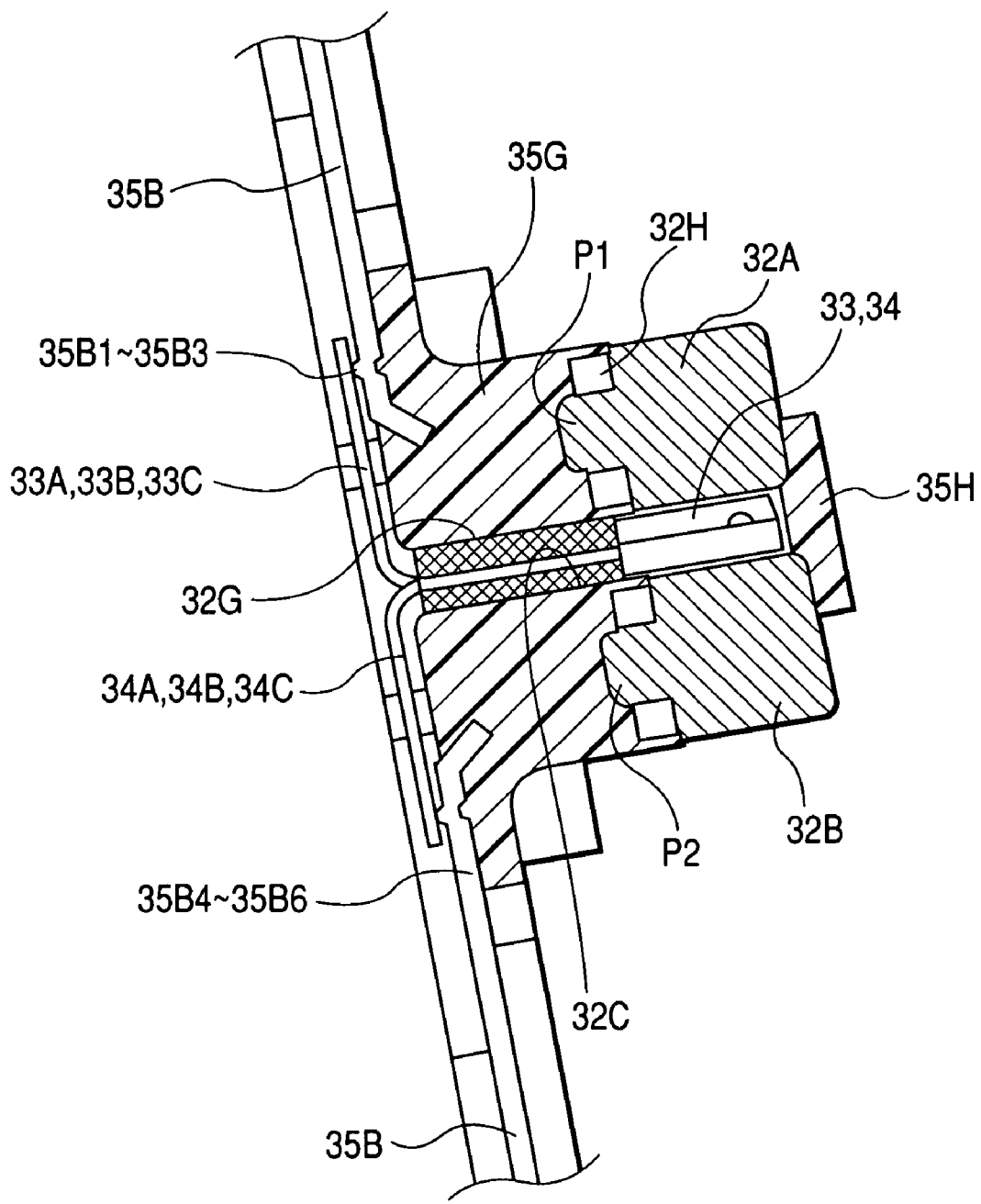
FIG. 11 is an enlarged sectional view of the stator section of the embodiment.

Details of the stator section 32 will be discussed hereinafter with reference to FIGS. 11 to 13.

The stators 23A, 23B are comprised of two pieces of magnetic material which are each shaped like each of halves of a cylindrical member. In this embodiment, the magnetic material pieces are made by machining. However, the stators may be made by forging, and may be formed of sintered material or comprised of laminates in which steel sheets are laminated.

In this embodiment, formed at one ends of the two magnetic material pieces are protrusions P1, P2, which are inserted through a pair of holes H1, H2 formed in a connecting member 35H of nonmagnetic material and are then riveted over the connecting member (K1, K2), whereby the three members are formed as a one piece member. Thus, a magnetic detecting gap 32C for installing the Hall ICs 33, 34 is provided at a position where the pair of the stators 32A, 32B face each other.

In molding processes of the stator section 32, a formwork is inserted into the magnetic detecting gap 32C, and only both sides and one end surfaces of the magnetic detecting gap and stators' surfaces adjacent to them are exposed. In this conditions, the remaining outer peripheries of the stators are brought in contact with the mold, and then a cylindrical body of the stator-section is molded (pre-molded) together with the electrical conductor 35B and an electrical conductor 35BM for connecting the motor, with molding resin material. The molding resin contains thermoplastic polybutylene phthalate or thermoplastic polyphenylene sulfide as a main component. Such a pre-molded body (pre-molded member) is shown in FIG. 13.

The pre-molded stator section 32 constitutes a resin molded body (resin molded member) 35G including the belt-shaped resin portion 35H. The resin portion 35H covers the periphery of the magnetic detecting gap 32C, so that grease for the bearings or air contaminants (e.g., corrosive components in EGR gas) are hard to adhere on the Hall ICs 33, 34 mounted in the interior of the gap 32C.

A plurality of radially extending ribs 110 and a frame-shaped rib 111 to be connected with the ribs 110 are formed around the stator section 32. The rib 111 is located outside of the ribs 110. Thus, the secular change of the position of the stator section 32 is prevented and the deviation of thereof is prevented from occurring due to exertion of external force.

Figure 14:
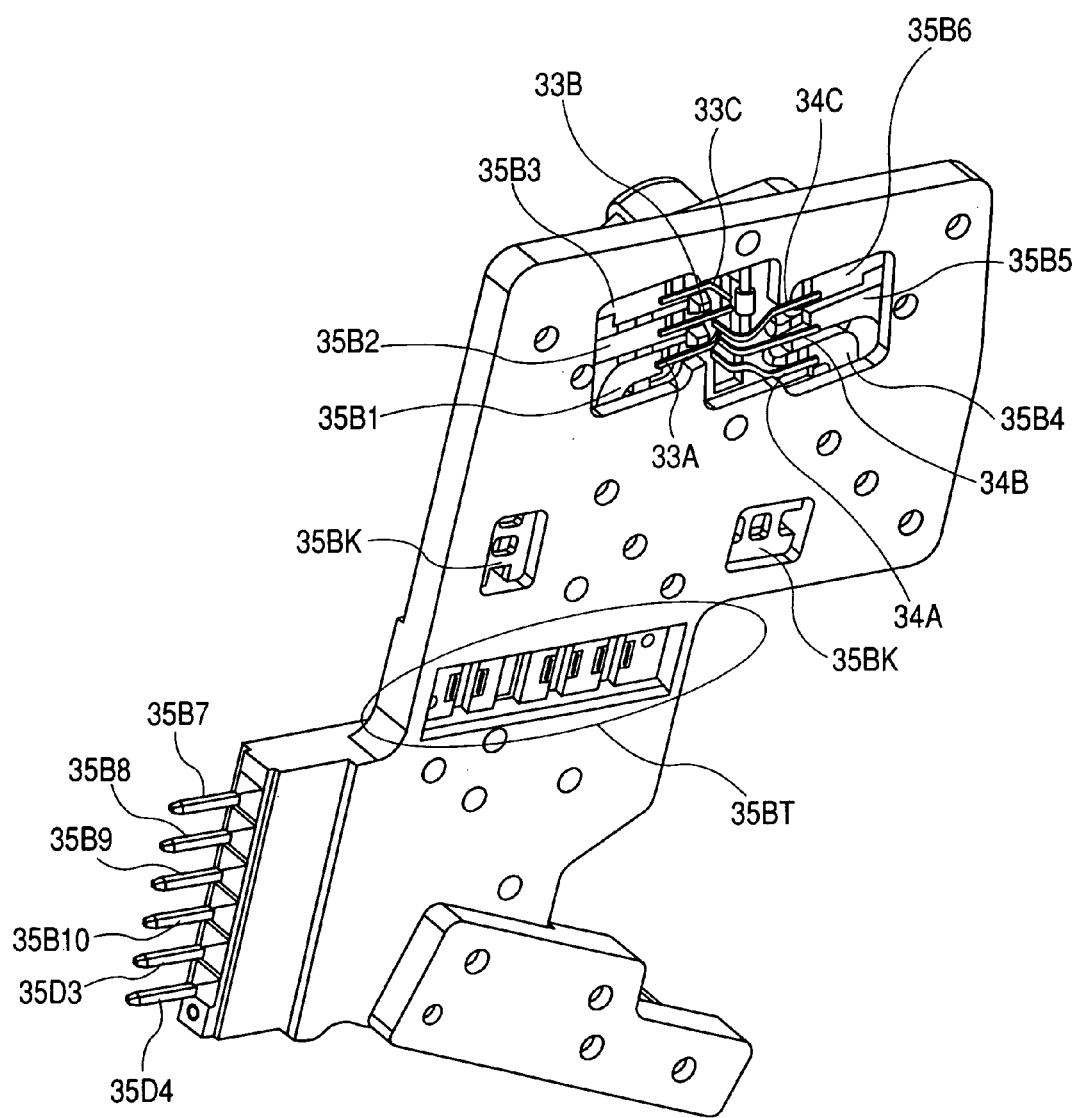
FIG. 14 is a perspective view showing the back of FIG. 13.
Figure 15:
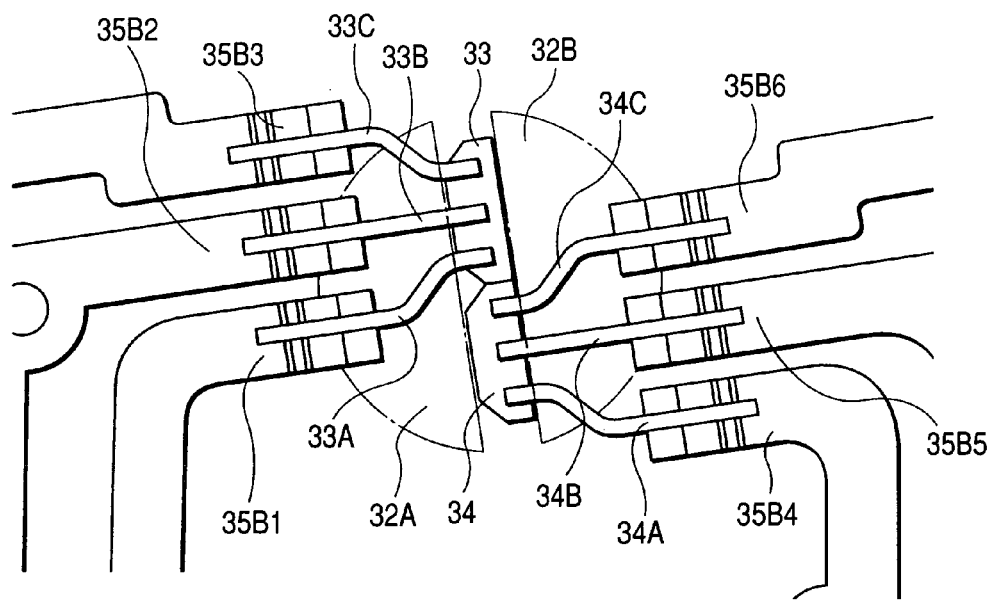
FIG. 15 is an enlarged plan view of the stator section of the first embodiment.
Figure 16:
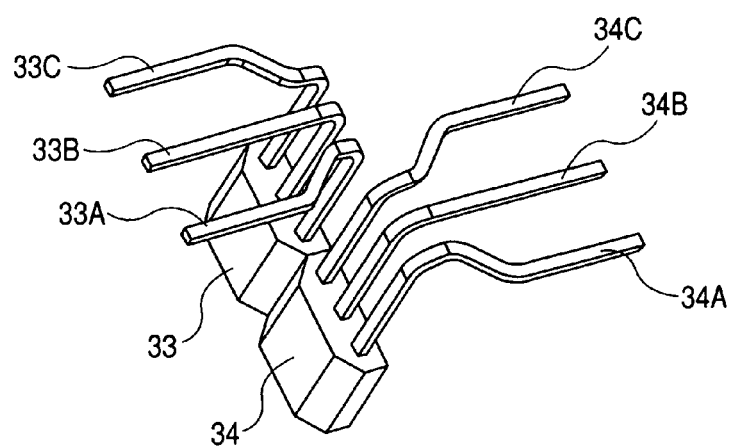
FIG. 16 is a perspective view of assistance in explaining the arrangement of the Hall ICs used in the first embodiment.

The two Hall ICs 33, 34 are inserted side by side in the magnetic detecting gap 32C of the stator section 32 in such a manner that magnetic sensitive surfaces thereof are directed in the same direction. As shown in FIGS. 14 to 16, each of the Hall ICs 33, 34 is provided with three input and output terminals, namely a power supply terminal 33A, a ground terminal 33B and a signal outputting terminal 33C. Those two groups-three out put terminals are bent in the directions opposite relative to each other. The three terminals (power supply terminal 34A, ground terminal 34B and signal outputting terminal 34C) of the Hall ICs 33 are connected with terminals 35B1 to 35B3 of the electrical conductor 35B, and similarly the three terminals 34A to 34C are connected with terminals 35B4 to 35B6 of the electrical conductor 35B.

Soft epoxy resin (elastomeric epoxy resin) 32G is filled into the magnetic detecting gap 32C in which the two Hall ICs 33, 34 are inserted, and then hardened. Thus, the grease for the bearings or air contaminates (e.g., sulfur component in EGR gas) are hard to adhere to the Hall ICs 33, 34. If the sulfur component adheres to the terminals of the Hall ICs or the electrical conducting portion and grows, the terminals are corroded and disconnected and signal current is hard to flow. Also, there is a possibility that electrical shorts are produced between adjacent terminals or between adjacent electrical conductors by adhered sulfide. In this embodiment, these problems can be overcome.

Incidentally, in a case where the Hall ICs are cantilevered at the terminals only in the magnetic detecting gap and held in the gap without soft resin, the Hall ICs in the magnetic detecting gap are mechanically vibrated along the magnetic sensitive surface or in the passage direction of magnetic flux by vibration of the engine or vibration of a vehicle. This not only exerts a detrimental effect on the detection property but also causes damage of the terminals. In this embodiment, the soft epoxy resin as soft as rubber is embedded in the magnetic detecting gap in which the Hall ICs are mounted, so that the Hall ICs are not vibrated and the above-mentioned problems are not brought about.

Although the soft epoxy is thermally deformed at the time of thermal hardening and such resin's deformation stress is exerts the Hall ICs 33, 34, at this time, the soft epoxy resin is also mechanically deformed by rebound from the Hall ICs. Therefore resin's deformation stress is absorbed by itself, and the positional deviation of the Hall ICs 33, 34 is prevented. This effect is exerted even after the rotation angle sensor is carried on the vehicle. That is, even when molding resin-deformation stress produced due to temperature variation exerts directly the Hall ICs 33, 34 or indirectly the input and output terminals thereof, the soft epoxy resin absorbs this stress. Thus, the effect of hardly causing the secular change of the position of the Hall ICs 33, 34 is obtained.

Incidentally, in this embodiment, although the magnetic detecting gap (the Hall IC installing gap) is filled with the soft epoxy resin, the Hall ICs may be previously covered with elastic material such as silicone rubber in order that the Hall ICs are hard to be subjected to vibration. In this case, the Hall ICs including portions of the terminals thereof may be covered except for terminal portions to be welded or soldered. Moreover, silicone gel may be filled into the magnetic detecting gap.

The electric conductor 35B is provided with six connecting terminals to which the three input and output terminals 33A, 33B, 33C of the Hall ICs 33 and the three input and output terminals 34A, 34B, 34C of the Hall ICs 34 are connected, but the number of the external connection terminals of the connector portion 35K is four (35B7 to 35B10).

The terminals 33A, 34A of the Hall ICs 33, 34 constitute the power supply terminals, so that the two terminals are put together into one piece at a junction portion 35CR2 situated midway along the terminals. Thereby a common power supply external connection terminal 35B8 can be obtained.

Moreover, the terminals 33B, 34B of the Hall ICs 33, 34 constitute the ground terminals, so that the two terminals are put together into one piece as 35B9 at a junction portion 35CR1 situated midway along the terminals. As a result, the external terminals of the connector portion 35k can be put together into four pieces in total.

At the both sides of the external connection terminals, signal output terminals 35B7, 35B10 of the Hall ICs 33, 34 are respectively arranged. A power supply terminal 35B8 (a voltage of 4.5 to 5.5 volts is applied) and a ground terminal 35B9 are arranged side by side between the both terminals 35B7, 35B10. Thus, the both Hall ICs-output ineffectiveness, which is brought about by an electrical short of the both signal terminals 35B7, 35B10, can be prevented.

At the connector portion 35K, a pair of plus and minus external connection terminals 35D3, 35D4 for the motor 19 are arranged side by side.

The electrical conductor having the connection terminals 35B1, 35B4 is put together into one piece terminal at a junction 35CR2. The one piece terminal intersects in two levels with a junction 35CR1 of the electrical conductor having the connection terminals 35B2, 35B5 at a point 35BC. It is necessary to contrive to cause the both electrical conductors not to be electrically brought in contact with each other at the solid crossing portion 35BC. In this embodiment, a hole 35BP in which a positioning pin is to be inserted is provided at the junction portion 35CR1 of the electrical conductor. In advance of pre-molding, an interval between the electrical conductor (35CR1) and the back electrical-conductor (35BC) is kept by inserting the positioning pin into the hole 35B. In this condition, as resin-molding is carried out, the interval between those conductors is kept even after resin-molding.

The electrical conductor having the connection terminals 35B2, 35B3 is connected at a junction 35BK until the pre-molding is completed. The electrical conductor 35B having the connection terminals 35B5, 35B6 is also connected at the junction 35BK until the pre-molding is completed. Moreover, as discussed above, the electrical conductor 35B having the connection terminals 35B2, 35B5 is connected at the junction 35CR1, so that these electrical conductors constitute a single electrical conductor. Therefore, at the time of the pre-molding, four electrical conductors, which is comprised of the electrical conductor 35B (power supply conductor) having the connection terminals 35B1, 35B4, the single electrical conductor 35B (two signal conductors and a ground conductor being put together into one piece), and two electrical conductor 35BM for connection of the motor, are insert-molded with resin-molding. Thus, the number of parts at the time of pre-molding is reduced as little as possible, and positioning of molded components is easily carried out. Also, since the electrical conductors are jointed with each other and a per-piece area of the electrical conductors is increased, positioning of the electrical conductors at the time of resin molding can become stable. Consequently, stable resin-molding for the molded body of a magnetic sensor can be carried out under a stable condition, and the yield of the resin molded body including conductors is improved.

The electrical conductor 35B is formed at key points thereof with holes 35BH in which the positioning pins are to be inserted. The positioning pins are inserted in all of the holes at the time of the molding. When the positioning pins are removed from the holes after the molding, there are many holes remained. After the pre-molding, a post-molding process where the resin cover 30 including pre-molded body 35G is molded is carried out. When the post-molding is carried out, the molded resin flows into the remained holes, thereby it is to facilitate enhancing of adhesion of the post-molded-resin to the pre-molded resin.

Incidentally, after the pre-molding, the junction 35BK is cut by punching to cause the electrical conductors to be separated from each other.

Figure 17:
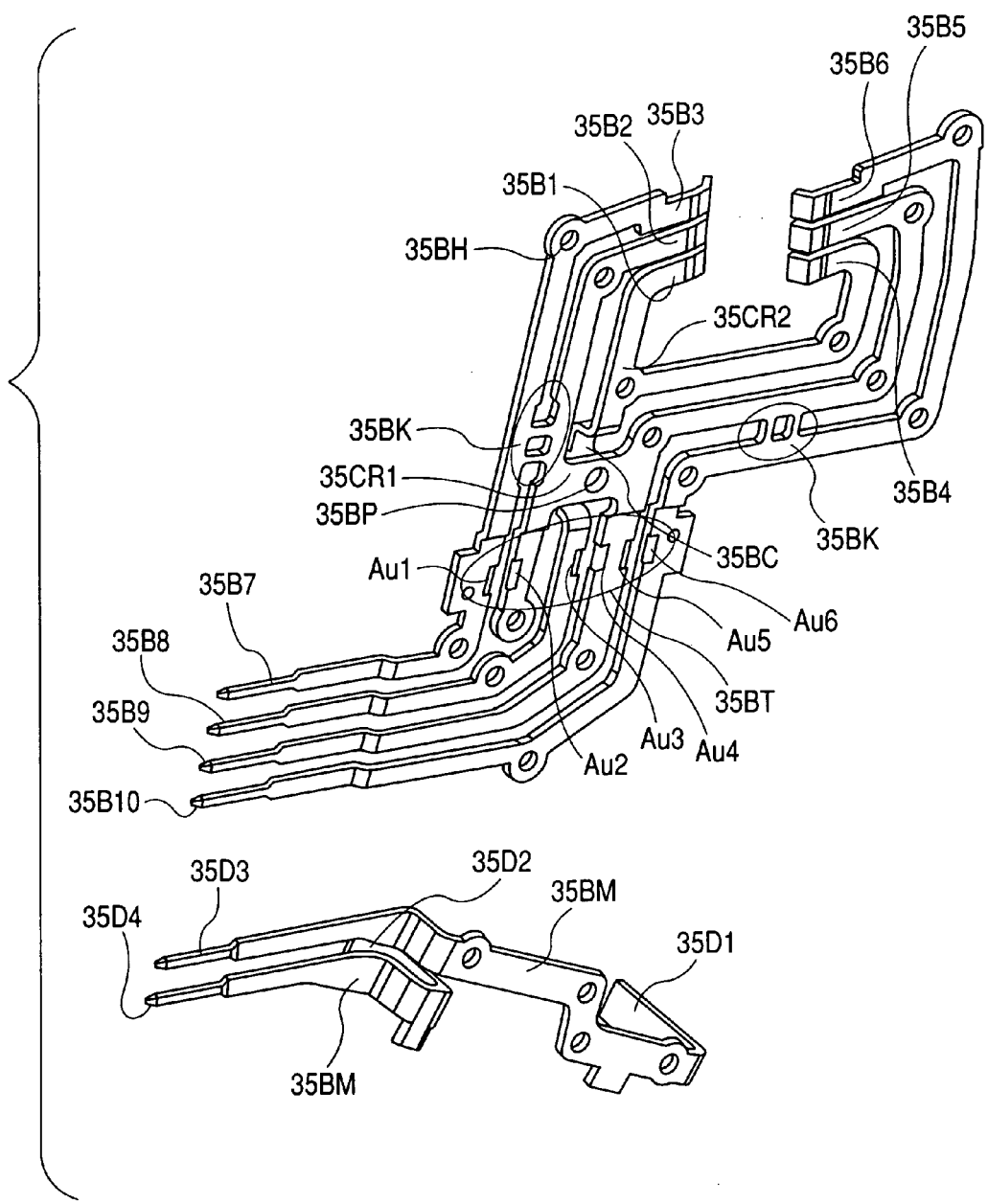
FIG. 17 is a perspective view showing the arrangement condition of the electrical conductor in the first embodiment.
Figure 18:
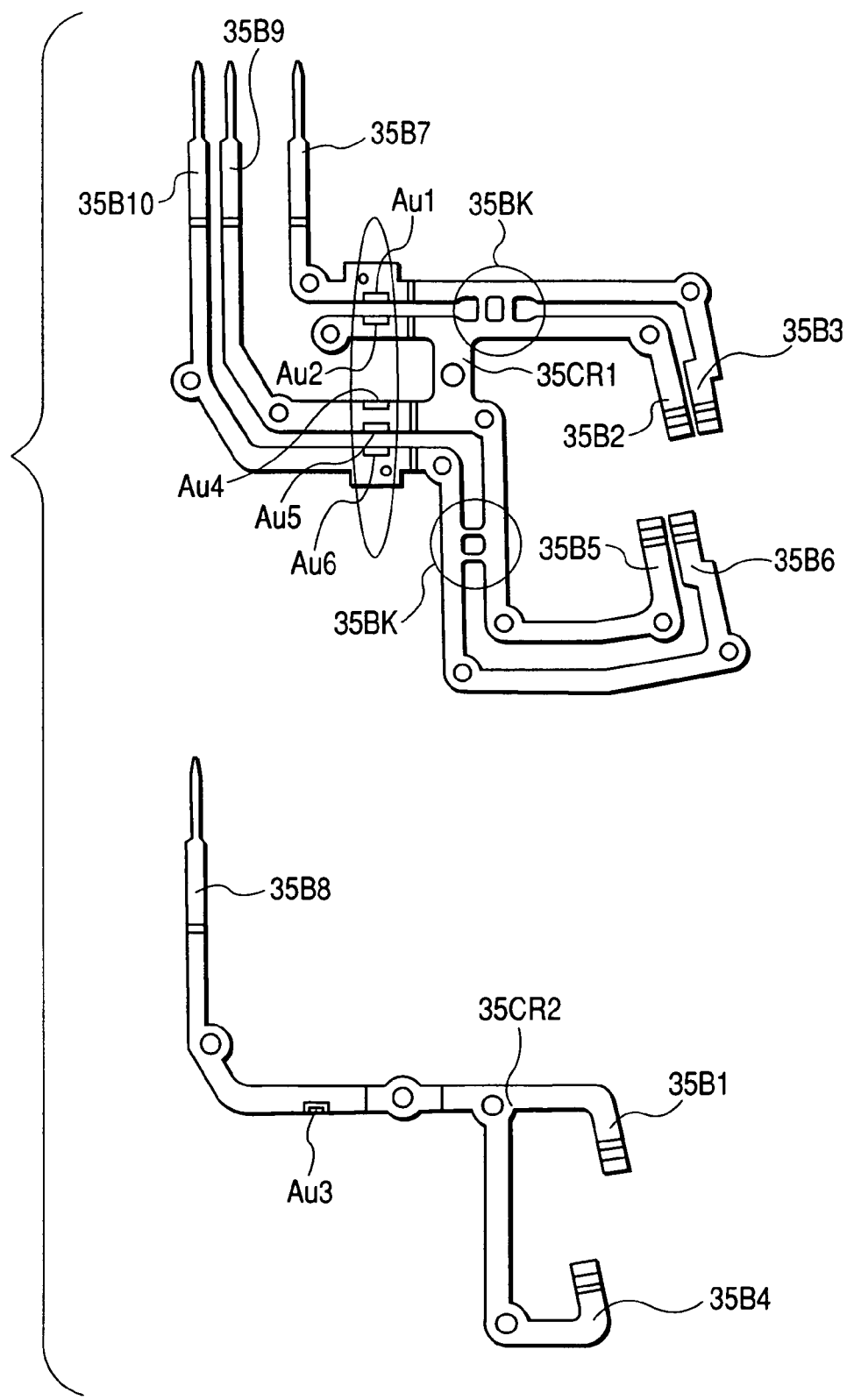
FIG. 18 is a plan view of assistance in explaining the details of the arrangement condition of the electrical conductor of the first embodiment.
Figure 19:
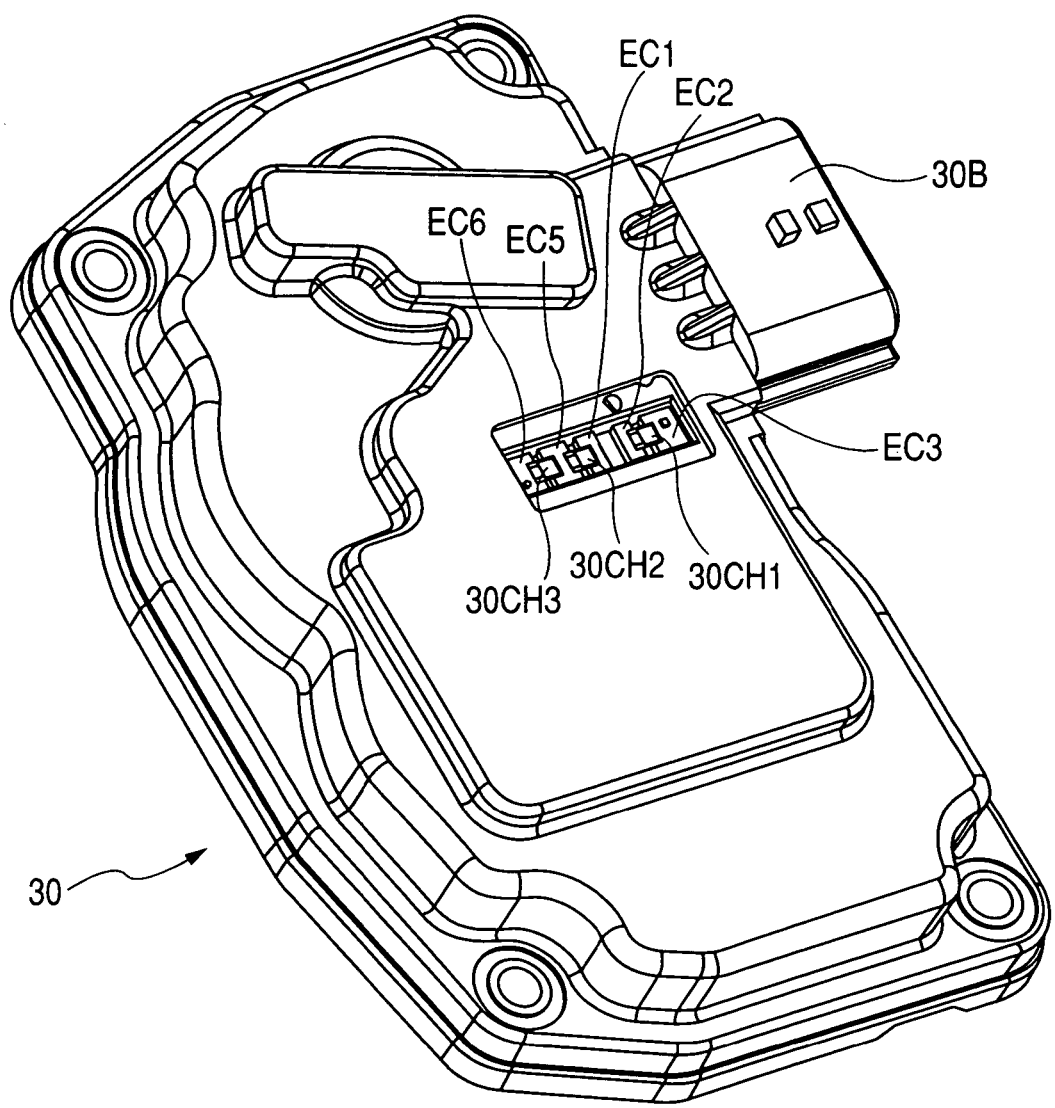
FIG. 19 is a perspective view of assistance in explaining the condition where the capacitor of the resin cover of the first embodiment is mounted.
Figure 20:
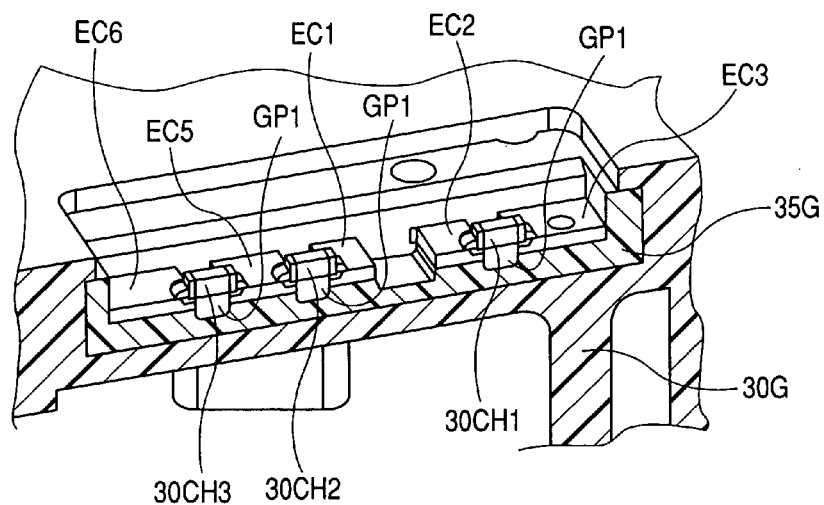
FIG. 20 is an enlarged perspective view of the capacitor mounted portion of the first embodiment.

Among the electrical conductors, adjacent portions EC2, EC3 of the signal conductor with the connection terminal 35B2 and the ground conductor with the connection terminal 35B3, adjacent portions EC5, EC6 of the other ground conductor with the connection terminal 35B5 and the other signal conductor with the connection terminal 35B6, and adjacent portion EC1, EC5 of the power supply conductor with the connection terminal 35B1 and the ground conductor with the connection terminal 35B5, are formed with chip capacitor-installing recess portions Au1 to Au6 (FIGS. 17 and 18). These recess portions are gold-plated at edges of their electrical conductors, and the chip capacitors 35CH1 to 35CH3 are respectively installed between AU1 and AU2, between AU3 and AU4, and between AU5 and AU6 via electrically connecting.

After the pre-molding, the post-molding is carried out while applying a mask to an area of the recess portions AU1 to AU6. After the post-molding, the mask is removed from the area of the recess portions and silver paste is applied onto the gold-plate of the recess portions Au1 to Au6. The chip capacitors 35CH1 to 35CH3 are placed on the silver paste and the silver paste is then hardened. When the silver paste is hardened, epoxy resin is potted from above the chip capacitors, and the chip capacitors are insert-molded so as to look like as if being inserted with the second resin-molding. Although respective gaps GP1 are remained between lower portions of the chip capacitors 35CH1 to 35CH3 (namely backs of the chip capacitors 35CH1 to 35CH3) and the resin molded body 35G before the post-resin molding, the gaps GP1 are filled with epoxy resin. The epoxy resin is applied to not only the upper surfaces of the chip capacitors 35CH1 to 35CH3 but also the backs thereof 35CH1 to 35CH3, and the epoxy resin covers around these chip capacitors, and the epoxy resin is then hardened. In the resin-potted portion constructed in this way, when the resin is hardened, stress which wrenches the chip capacitors 35CH1 to 35CH3 away from a bonding portion between the chip capacitors and the silver paste is not produced.

To explain concretely, the chip capacitors-upward pull-up force applied onto upper surfaces and the chip capacitors-downward pull-up force (pull-up force toward pre-molded body side) applied onto back surfaces (lower surfaces), are mutually cancelled. Thereby the force which wrenches the chip capacitors away from the silver paste bonding portion doesn't exert the chip capacitors.

Incidentally, as in this embodiment, the electrical conductors are arranged in such a manner that the chip capacitors are mounted at the following position (FIGS. 19 and 20):

a position between adjacent portions EC2, EC3 of the signal conductor with the connection terminal 35B2 and the ground conductor with the connection terminal 35B3, a position adjacent portions EC5, EC6 of the other ground conductor with the connection terminal 35B5 and the other signal conductor with the connection terminal 35B6, and a position adjacent portion EC1, EC5 of the power supply conductor with the connection terminal 35B1 and the ground conductor with the connection terminal 35B5. According to this chip mounting structure, one chip capacitor to be mounted between the power supply conductor and the ground conductor can be omitted.

Now, an idea of the positional relationship between the magnetic detecting gap of the stator and the magnets will be discussed hereinafter with reference to FIGS. 21 and 22.

Figure 21:
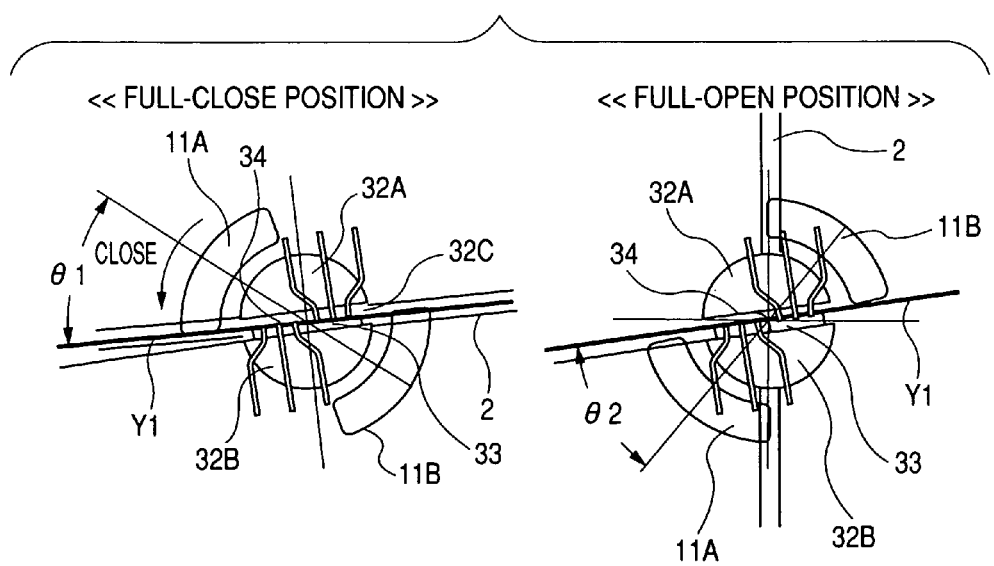
FIG. 21 is a view of assistance in explaining the positional relationship between the magnets and the stator in the first embodiment.
Figure 22:
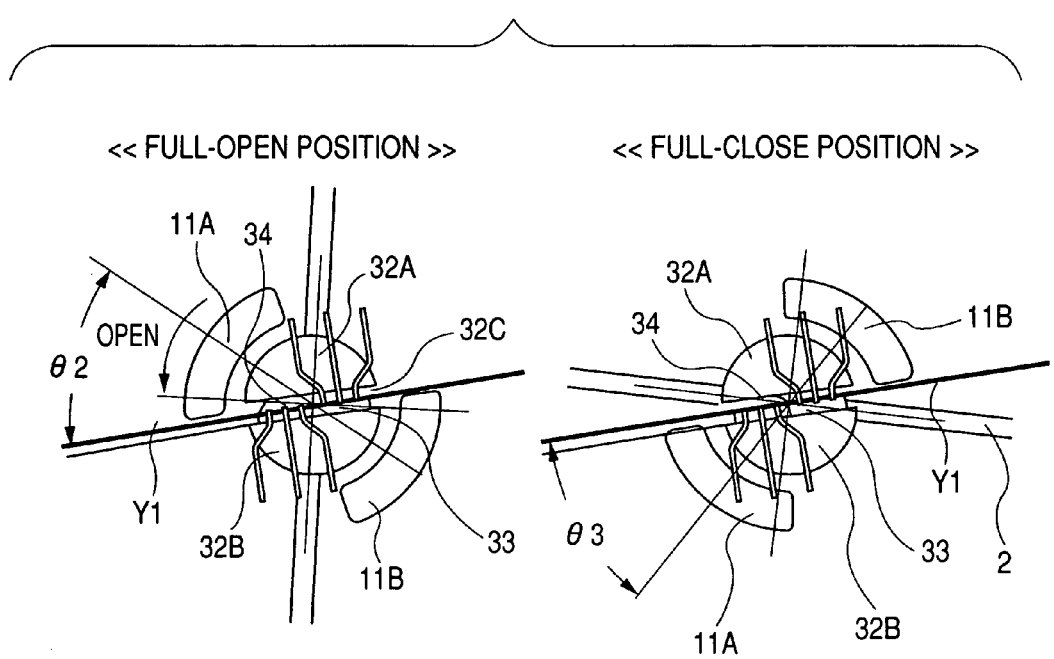
FIG. 22 is a view of assistance in explaining the positional relationship between the magnets and the stator in the second embodiment.
Figure 23:
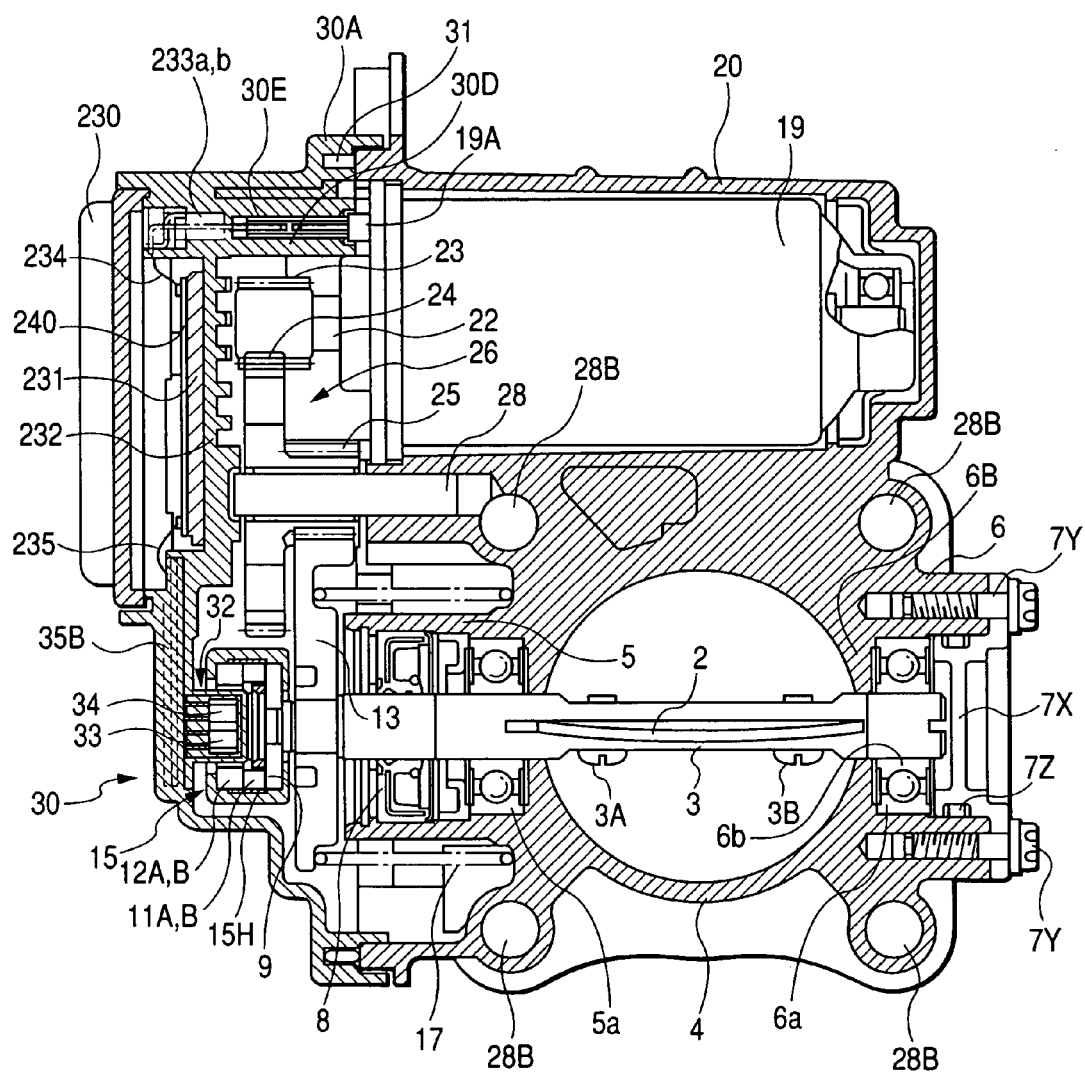
FIG. 23 is a sectional view showing the second embodiment in which the rotation angle sensor according to the present invention is applied to the throttle control device for the diesel engine.
Figure 24:
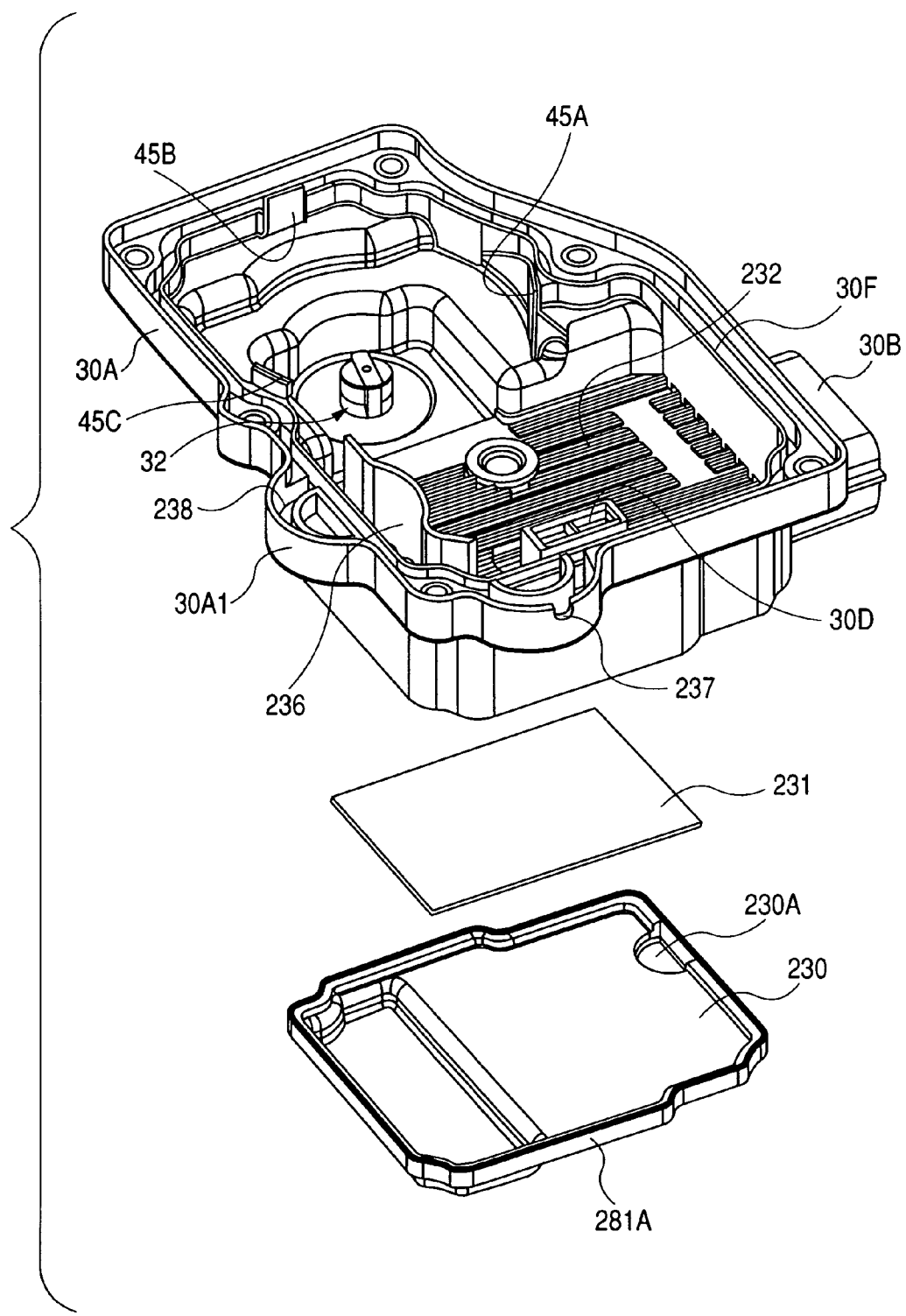
FIG. 24 is a perspective view showing the inner side of the resin cover of the second embodiment.
Figure 25:
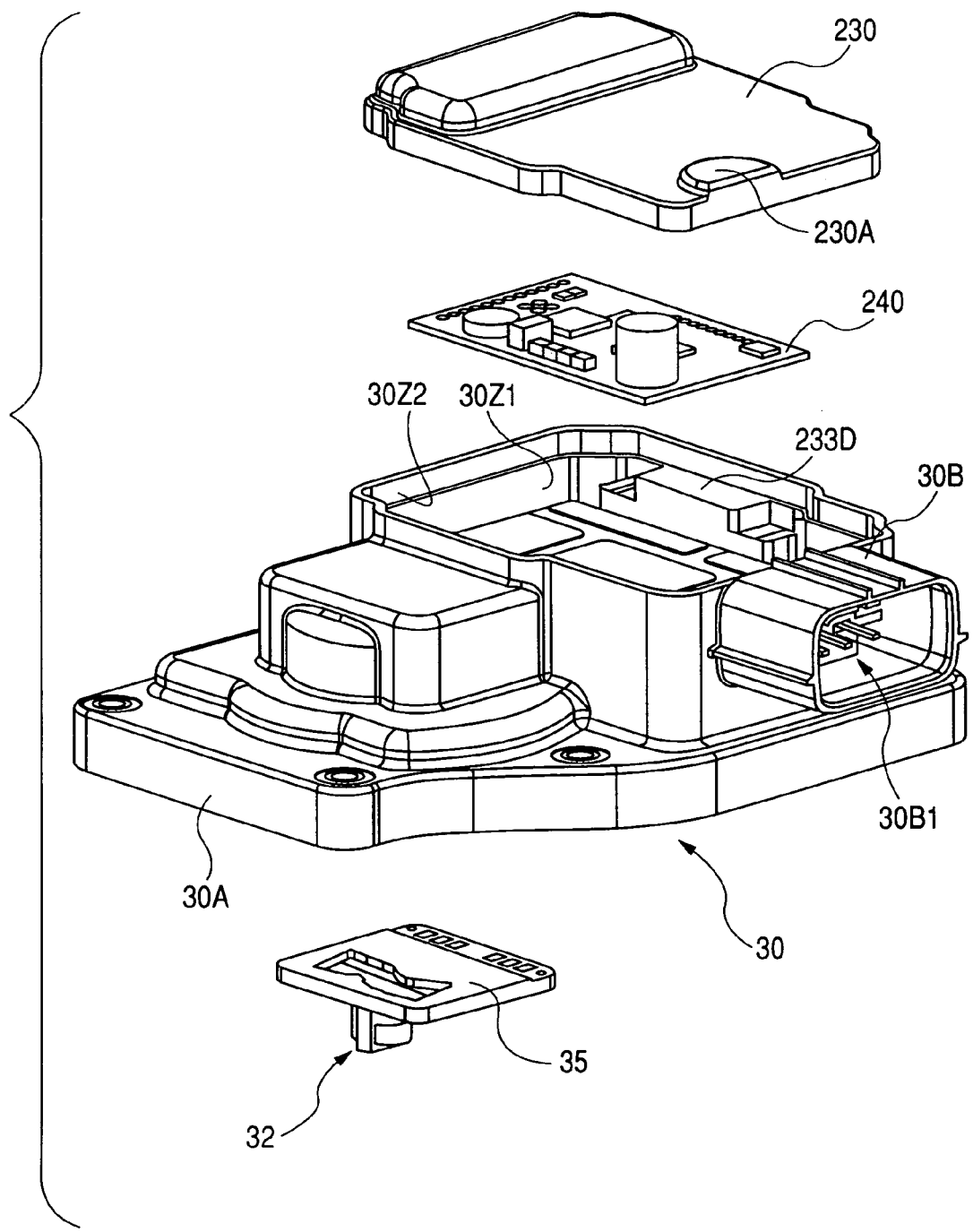
FIG. 25 is an exploded perspective view of the resin cover of the second embodiment.
Figure 26:
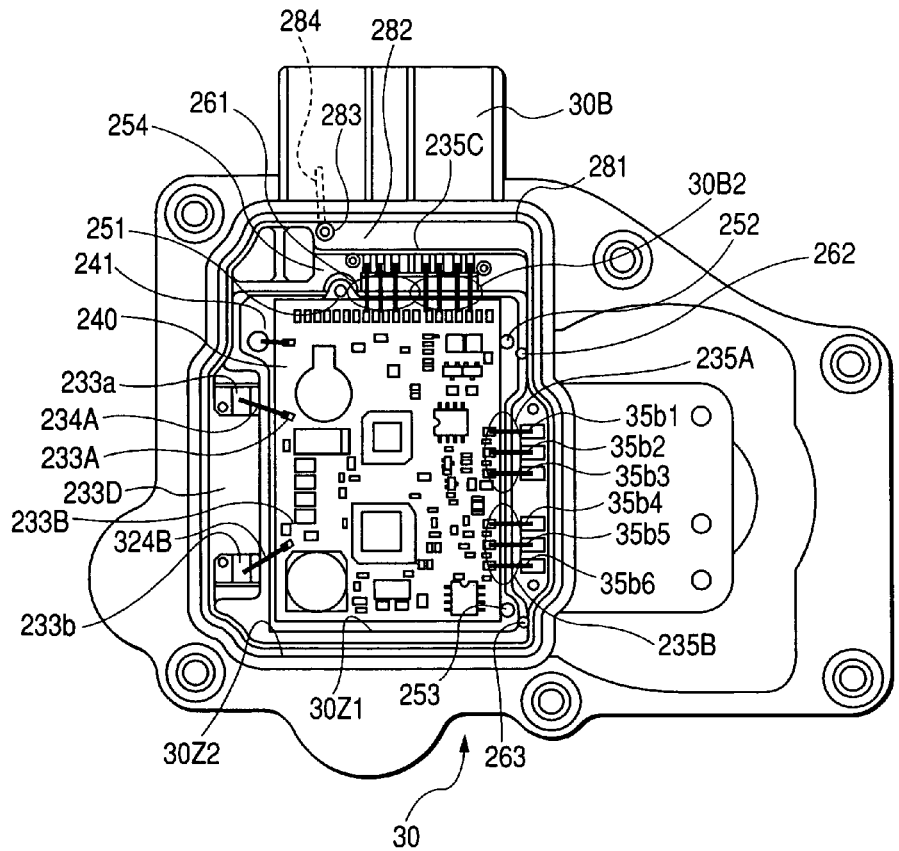
FIG. 26 is a plan view of the control circuit portion of the resin cover of the second embodiment.
Figure 27:
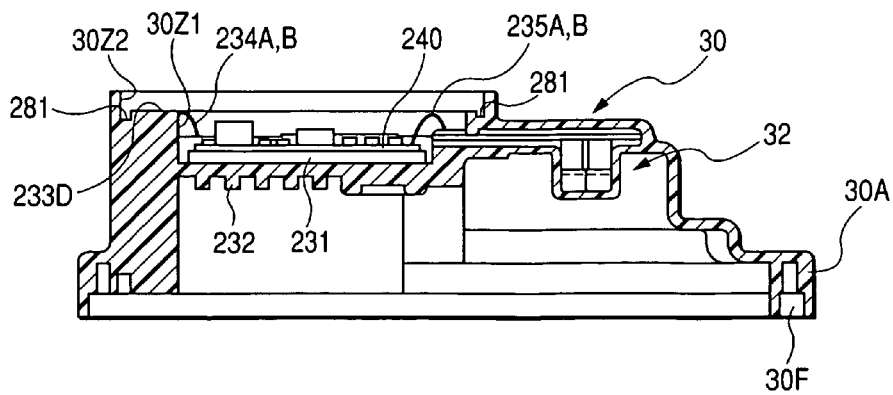
FIG. 27 is a sectional view of FIG. 26.

FIG. 21 and FIG. 22 show an embodiment of a gasoline vehicle and an embodiment of a diesel vehicle, respectively.

In FIG. 21, a drawing on the left side shows the positional relationship between the stator section 32 and the rotor section 15 in a condition where the throttle valve 2 is fully closed. Such condition is brought about, for example, at the time of full-close learning immediately after a key switch for the engine is turned on, or at the time of the occurrence of an overshoot on the control during the vehicle traveling. At this time, the throttle valve 2 is rotated by the motor 19 until the stopper contact-portion 13A of the throttle gear 13 is brought in contact with the full-open stopper 41.

In this condition, arc-shaped magnets 11A, 11B-circumferential one ends being diagonally opposite to each other are overlapped onto a straight line Y1 which pass a center of the rotor section 15 and parallel to opposite surfaces of the stators 32A, 32B.

Figure 12:
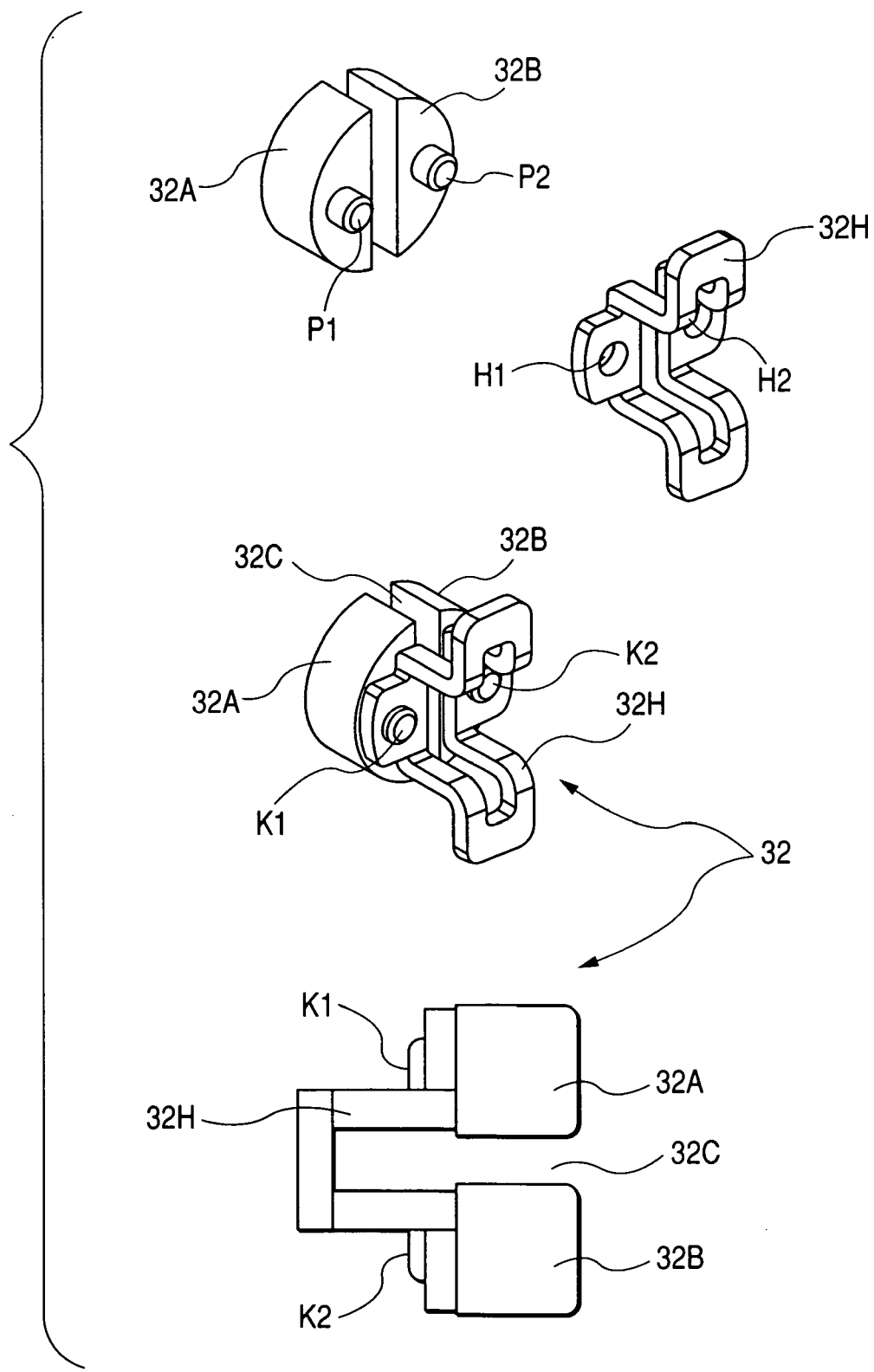
FIG. 12 is an enlarged perspective view of assistance in explaining the construction of the stator of the first embodiment.
Figure 13:
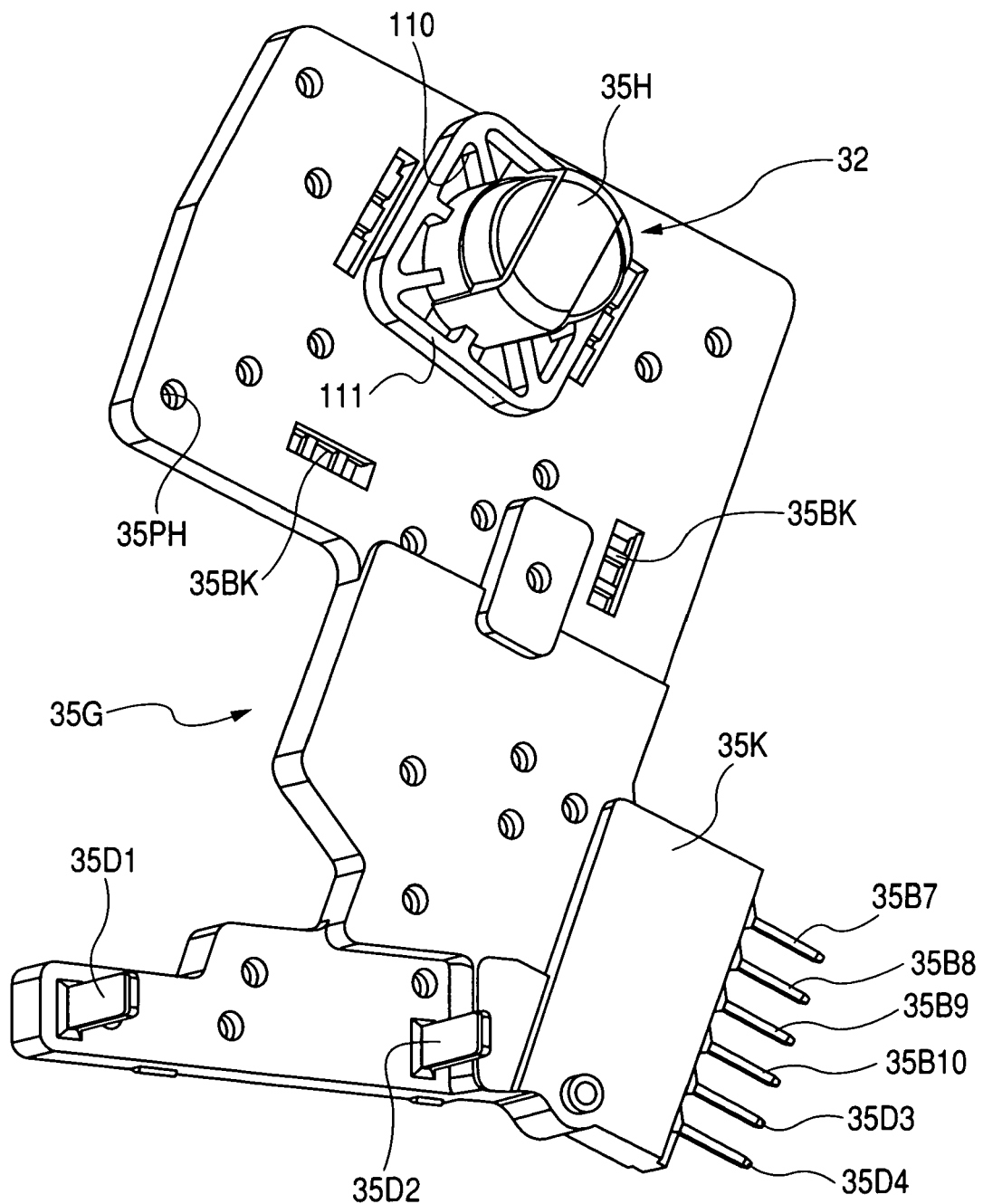
FIG. 13 is an enlarged perspective view of the first resin molded body of the first embodiment.

In FIG. 12, a drawing on the right side shows the positional relationship between the stator section 32 and the rotor section 15 in a condition where the throttle valve 2 is fully opened. Such condition is brought about at the time of checking of full-open degree angle during assembling process, or at the time of the occurrence of an overshoot on the control during the vehicle traveling. At this time, the throttle valve 2 is rotated by the motor 19 until the stopper-contact portion 13B of the throttle gear 13 is brought in contact with the full-open stopper 41.

In this condition, arc-shaped magnets 11A, 11B-circumferential another ends being diagonally opposite to each other are overlapped on the straight line Y1.

Thus, arc-shape angles of the magnets 11A, 11B and an action angle of the throttle valve are set so as to be equal to each other.

Incidentally, the arc-shape angles of the magnets 11A, 11B, namely, the action angle of the throttle valve 2 is set to about 85 degrees. Angles θ1, θ2 between the straight line Y1 and positions at halves of the arc-shape angles of the magnets (position at half of the throttle opening=half opening position) are about 42.5 degrees.

Arc-shape angles of the yokes 12A, 12B pairing off with the magnets 11A, 11B as described above are set to 110 degrees. As a result, circumferential one end positions of the arc-shaped magnets 11A, 11B become slightly overlapped on circumferential one ends of the stator 32A, 32B, whereas the yokes 12A, 12B are formed so as to have overlapping portions overlapped on the circumferential one end portions of the stators 32A, 32B by about 6 degrees.

Outputs of the Hall ICs 33, 34 are minimums at the half opening position of the throttle valve 2. According to the above-mentioned arrangement, even if the throttle valve 2 (namely, the arc-shaped magnets 11A, 11B and yokes 12A, 12B of the rotor section 15) rotates by 42.5 degrees in the close direction from the half opening position or rotates by 42.5 degrees in the open direction from the half opening position, amount of the magnetic flux passing the magnetic detecting gap 32C is not reduced. Therefore, detection accuracy on both the open side and the close side around the half opening position is high and uniform detection property can be provided. The arc-shape angles of the respective arc-shaped magnets 11A, 11B may be small, thus reducing the cost of the magnets.

In FIG. 22, a figure on the left side shows a positional relationship between the stator 32 and the rotor 15 in a condition where the throttle valve 2 is fully opened.

Such a condition is brought about, for example, at the time of full-open learning operation immediately after the key switch for the engine is turned on, or when an overshoot on the control occurs at the time of the vehicle traveling. At this time, as will be discussed later, the throttle valve 2X is rotated until a stopper-contact portion (not shown) of the throttle gear 13X is brought into contact with a full-open stopper.

In this condition, arc-shaped magnets 11A, 11B-circumferential one ends being diagonally opposite to each other are overlapped onto a straight line Y1 which pass a center of the rotor section 15 and parallel to opposite surfaces of the stators 32A, 32B.

In FIG. 22, a figure on the right side shows a positional relationship between the stator section 32 and the rotor section 15 in a condition where the throttle valve 2X is fully closed. This condition is brought about at the time of the full-close checking during the assembling process, or when an overshoot on the control occurs at the vehicle traveling. At this time, the throttle valve 2X is rotated by the motor 19 until the stopper contact portion (not shown) of the throttle gear 13X is brought into contact with the full-open stopper.

In this condition, arc-shaped magnets 11A, 11B-circumferential another ends being diagonally opposite to each other are overlapped on the straight line Y1.

Thus, the arc-shape angles of the magnets 11A, 11B and the action angles of the throttle valve 2X are set so as to be equal to each other.

The arc-shape angles of the arc-shaped magnets 11A, 11B, namely, the action angle of the throttle valve 2 is set to about 86.5 degrees. Angles θ1, θ2 between the straight line Y1 and positions at halves of the arc-shape angles of the magnets (position at half of the throttle opening=half opening position) are about 43.25 degrees.

Arc-shape angles of the yokes 12A, 12B pairing off with the magnets 11A, 11B as described above are set to 110 degrees. As a result, circumferential one end positions of the arc-shaped magnets 11A, 11B become slightly overlapped on circumferential one ends of the stator 32A, 32B, whereas the yokes 12A, 12B are formed so as to have overlapping portions overlapped on the circumferential one end portions of the stators 32A, 32B by about 6 degrees.

Outputs of the Hall ICs 33, 34 are minimums at the half opening position of the throttle valve 2. According to the above-mentioned arrangement, even if the throttle valve 2 (namely, the arc-shaped magnets 11A, 11B and yokes 12A, 12B of the rotor section 15) rotates by 43.5 degrees in the close direction from the half opening position or rotates by 43.5 degrees in the open direction from the half opening position, amount of the magnetic flux passing the magnetic detecting gap 32C is not reduced. Therefore, detection accuracy on both the open side and the close side around the half opening position is high and uniform detection property can be provided. The arc-shape angles of the respective arc-shaped magnets 11A, 11B may be small, thus reducing the cost of the magnets.

In this embodiment, as described above, it is possible to obtain the magnetic flux as much as possible by the magnets whose arc-shape angles are as small as possible.

Embodiment 2

A embodiment, in which a throttle position sensor as the rotation sensing device of the present invention is applied to a throttle control device of a diesel engine, will be discussed hereinafter with respect to FIGS. 23 to 27.

Components which are denoted by the same designators as used in FIGS. 1 to 22 perform the same function.

The throttle valve device of this embodiment is adapted to be operated so as to close an air-intake pipe by timing of controlling of the exhaust gas recirculation of the diesel engine (hereinafter referred to as "EGR control", exhaust gas recirculation control). Thus, a downstream from the throttle valve 2X in the air intake pipe becomes negative pressure and the exhaust gas is drawn into the air-intake pipe.

When the throttle valve 2X is in an operated condition except the EGR control, the throttle value 2X is kept at the full-open position as shown in a figure on the right side of FIG. 22.

The throttle controlling device is used as a device for producing negative pressure, so that it is necessary to reduce air leakage (air escaping from the outside into the air inlet duct through the bearing portion for the throttle shaft) as little as possible. To this end, a seal cover 7X having a seal ring 7Z provided around a periphery thereof is fastened to the throttle body 4 by screws 7Y.

In the throttle controlling device of this embodiment, a return spring 17 is arranged around the bearing-installing boss portion 5 formed at the throttle body 4. One end of the return spring 17 is hooked to the throttle gear fixed on the throttle shaft 3, and the other is hooked to the throttle body so that the full-open position of the throttle valve becomes an initial position.

A torque for rotating the throttle shaft 3 in a close direction is transmitted through the output gear 23 fixed to the rotating shaft 22 of the motor 19, the intermediate gear 26 (large diameter gear 24, small diameter gear 25), and the throttle gear 13.

When the power supply to the motor 19 is cut off, the throttle valve is returned up to the full-open position as the initial position by the fore of the return spring 7.

The magnetic material-made metallic plate 9 of the rotor section 15 of the throttle position sensor serving as the non-contact-type rotation angle sensor is fixed to the tip end of the throttle shaft 3 by welding. In this embodiment, the throttle gear 13 and the rotor section 15 are formed as separate components. In this case, the pair of the arc-shaped magnets 11A, 11B and the pair of the arc-shaped yokes 12A, 12B are set in a resin-made holder 15H. The metallic plate 9, the holder 15H, the pair of the arc-shaped magnets 11A, 11B and the pair of the arc-shaped yokes 12A, 12B are insert molded with a resin member.

The cylindrical stator section 32 mounted to the inner side of the resin-made cover 30 is inserted in a cylindrical space surrounded by the pair of the arc-shaped yokes 12A, 12B, whereby the throttle position sensor serving as the noncontact-type rotation angle sensor is constructed.

Casing portions 30Z1, 30Z2 are formed on the outer surface of the resin cover 30. A metal plate 231 which serves as a heat sink is bonded onto a bottom surface of the casing portion 30Z1 within the casing portions 30Z1, 30Z2 by an adhesive. A control circuit board 240 is bonded onto the metal plate 231 by an adhesive. The casing portion 30Z2 of the resin cover 30 is a casing portion in which a lid member 230 is fitted.

The other ends (35b1, 35b2, 35b3, 35b4, 35b5, and 35b6) of the six electrical conductors 35B are fixed onto inner wall surfaces of the casing portion 30Z1. The input and output terminals (33A, 33B, 33C and 34A, 34B, 34C) of the Hall ICs 33, 34 fixed to the stator section 32 are connected with the one ends of the respective electrical conductors 35B. The other ends (35b1, 35b2, 35b3, 35b4, 35b5, and 35b6) of the electrical conductor 35B are connected with a sensor terminal which is disposed at one of long sides of the rectangular control circuit board 240 by wirebonding 234, 235.

The control circuit board 240 has two terminals 233A, 233b provided at a long side thereof which is opposite to the side of the control circuit board 240 at which the sensor terminal is arranged.

A shelf portion 233D with electrical conductors 233a, 223b to be motor-connection terminals is formed between the casing portion 30Z1 and the casing portion 30Z2. The shelf portion 233D is located between the long side of the control circuit board 240 and a side wall portion of the casing portion 30Z2 at inside of the lid member 230. The electrical conductors 233a, 233b are connected to the terminals 233A, 233B of the control circuit board 240 by wire bonding 234A, 234B.

The electrical conductors 233a, 233b extend to a back side of the resin cover 30 and constitute pin-type terminals of the terminal receiving portion 30D. Intermediate terminals 30E of both side-female type are inserted in the pin-type terminals of the terminal receiving portion 30D.

In the condition where the resin cover 30 is attached onto the throttle body 4, the two terminals 19A of the motor 19 are inserted in the remaining female terminals of the intermediate terminals 30E and electrically connected to the female terminals.

Thus, the terminals 19A of the motor 19 are electrically wired on a surface of the resin cover 30 and connected to the terminals 233A, 233B of the control circuit board 240.

One of the sides of the control circuit board 240 faces the connector 30B formed at the resin cover 30.

One ends of a plurality of electrical conductors 30B1 are arranged at the connector 30B, and the other ends 30B2 and 30B3 thereof are arranged at the inner wall surface of the casing portion 30Z1. In this embodiment, there are seven terminals which includes a power source terminal for the motor, a power source terminal for the throttle position sensor, a ground terminal for the motor, a ground terminal for the throttle position sensor, a throttle opening-target control signal terminal, and two terminals for sensing signals from the two throttle position sensors. Moreover, one spare terminal 235C is provided.

The spare terminal 235C is provided between the electrical terminal 30B2 for the throttle position sensor and the electrical terminal 30B3 for the motor.

A ground wiring pattern of the control circuit board is connected to a metal plate 231 for a heat sink by a bonding portion 241.

The stator section 32 and the electrical conductor 35B are pre-molded in the same manner as done in the embodiment. After the Hall ICs are set and electrically connected to the electrical conductor, the stator section 32 and the electrical conductor 35B are post-molded into the resin cover.

Thus, forming of the casing portions for housing the control circuit board and resin-sealing of the magnetic detecting gap of the stator section can be performed in a single process, thus improving operation efficiency.

It is possible to allow the circuit board to be isolated from the bearing-mounting boss portion 5, so that the control circuit board is not exposed to sulfur component of the exhaust gas and corrosion of the control circuit board is hard to occur.

The circuit board is arranged outside, so that an assembling process can be performed while piling up the circuit boards. When printing (laser printing) of a type of the device and mold number is finally to be carried out, it is unnecessary to turn the body over.

A resinous rib 232 to be formed on the inner side of the resin cover 30 prevents the casing portions 30Z1, 30Z2 of the resin cover 30 from being deformed by heat which is generated at the control circuit board 240 and radiated through the metal plate 231.

When the adhesive of bonding the control circuit board 240 to the metal plate 231, and the adhesive of bonding the metal plate 231 on the bottom surface of the casing portion are softened due to temperature rise, the control circuit board 240 floats. When stress is applied to the wirebonding at this time, the wirebonding may be cut and the bonding portions may be separated.

In order to prevent this, the control circuit board 240 is positioned at the long sides and short sides thereof by pins 251, 252, 253 which are provided integrally at the metal plate 231.

Moreover, long and short sides of the metal plate 231 are positioned by positioning portions 261, 262, 263 which are formed on an inner peripheral wall portion of the casing portion 30Z1 of the resin cover 30.

The casing portion 30Z2 has a groove 281 formed over the entire inner periphery thereof. This groove 281 receives a frame portion 281A of the lid member 230. An adhesive is poured into the groove 281, whereby the frame portion 281A of the lid member 230 fitted in the groove is bonded to the casing portion.

A small hollow protuberance 283 of a cylindrical shape is formed on a shelf portion 282 in the neighborhood of the connector 30B of the casing portion 30Z1. This protuberance 283 is located inside rather than the groove 281. A center bore of the protuberance 283 is communicated with a communicating passage 284 (indicated by broken lines) which is opened at one end thereof to the connector 30B.

Thus, even after the lid member 230 is attached to the casing portion 30Z2, the interior of the casing portion 30Z2 and the outside-air portion of the connector 30B are communicated through the bore of the protuberance 283, the communicating passage 284 and an opening of the connector 30B.

Consequently, a problem that the bonded portion of the control circuit board 240 is peeled by change in barometric pressure in the sealed space in which the control circuit board 240 is mounted, and floats, does not arise.

Incidentally, the lid member 230-inner side of facing the protuberance 284 is formed with a recess portion 230A. This recess portion 230A and one end of the protuberance 283 constitute a labyrinth section, so that moisture is hard to enter from the outside through the communicating passage 284.

Incidentally, the surface of the control circuit board 240 is coated with sealing gel resin and the one end of the protuberance 283 is opened over this gel layer, so that even if moisture enters, the moisture drops onto the gel layer and does not directly reach the control circuit board and the terminal connection portions.

Moreover, the back of the resin cover 30 has a screen 236 formed integrally therewith which faces the frame portion 30A. In a region of this screen 236, a bulged portion 30A1 is formed on the frame portion 30A. A breathing path which communicates with the outside and inside of the resin cover 30 is formed at a region of the bulged portion 30A1 so as to cross the seal member 31. The frame portion 30A spaced apart from the bulged portion 30A1 is formed with an opening 237. This opening 237 and the breathing path 238 are communicated with each other through a passage which is formed in the inner side of the frame portion 30A. Thus, the breathing passage 238 is opened to the exterior through the opening 237. This construction allows air to go in and out while preventing entrance of moisture. Therefore, when sulfur component of the exhaust gas enters the interior of the resin cover 30, the sulfur component is discharged out through the breathing passage, staying of the sulfur component can be reduced and a problem that the stator section 32 is corroded by sulfide can be reduced.

ADVANTAGES OF INVENTION

In accordance with the invention according to claims 1 and 2, the resin which is hard to apply to the magnetic sensitive elements a stress produced due to temperature changes can be used as a resin for protecting the magnetic sensitive elements. Accordingly, after the prior characteristic adjustment of the magnetic sensitive element, the changes of the magnetic sensitive element-characteristic in the installing condition of the magnetic sensitive elements can be reduced.

According to the invention according to claims 10 and 11, the driver circuit of the motor and the magnetic sensitive element section are integrally formed, so that it is possible to inspect the magnetic sensitive elements or inspect the adjustment in a manufacturing process line, while driving the motor by a driver circuit used in an actual product.

According to the invention according to claim 16, even if thermal deformation of the molded resin occurs, the stress thereof is hard to be applied to the bonding portions between the capacitor and the electrical conductor and debonding of the bonding portions can be prevented.

According to the invention according to claim 19, the wiring of the electrical conductor can be simplified.

According to the invention according to claim 24, the object whose rotation is detected can obtain the maximum responsibility at the half rotation position between the maximum and minimum rotation positions. When a range of rotation sensing is resultantly a narrow angle range, it is possible to maximize the sensing responsibility of the elements within the sensing range.

Moreover, the arc-shape angle of the yokes are made larger than the arc-shape angle of the magnets, so that even if the magnets whose arc-shape angles are small are employed, they can supply much magnetic flux to the magnetic sensitive surfaces of the magnetic sensitive elements, and sensing accuracy can be improved.

According to the invention according to claim 25, the varied amount of the magnetic flux in the intermediate sensed opening region that is frequently used at the vehicle traveling can be increased and the sensing accuracy in this region can be improved.

The range of the sensed opening in the throttle valve is about 90 degrees from the full-open to the full-close. Therefore, if the yokes which have arc-shape angles larger than this are provided, they can be used to detect the region in which the rate of change in the magnetic flux is large, and a good and uniform sensing accuracy can be obtained within the total region from the full-open to the full-close.

According to the invention according to claim 26, a change in the magnetic generating characteristic of the rotor which occurs due to heat is reduced and it is made possible to carry out highly accurate angle sensing.

According to the invention according to claim 30, when the plurality of the electrical conductors is to be insert-molded, some of the electrical conductors can be handled as a single electrical conductor piece at the time of the insert-molding, and the molding operation is easy to be carried out.

The present invention can be applied not only to the rotation angle sensor for the throttle valve of the internal combustion but also to an accelerator-pressing angle sensing device, a rotation angle sensor for a two wheel drive and four wheel drive switching device, a rotation position sensing device for an output shaft of an automatic transmission gear, and a rotation position detecting device for an output shaft of a variable wing control actuator of a variable displacement turbo.

What is claimed is:

1. A noncontact rotation angle sensor comprising:
   a magnetic sensitive element for sensing a magnetic flux of varying with a rotational position of a rotor,
   a pair of stators having a gap therebetween for installing said magnetic sensitive element,
   an electrical conductor for transmitting an output signal of said magnetic sensitive element, and
   a resin molded member for holding said stators including said magnetic sensitive element and said electrical conductors together,
   wherein a periphery of said magnetic sensitive element is enclosed with an elastic member filling said gap between said stators.

2. A noncontact rotation angle sensor comprising:
   a magnetic sensitive element for sensing a magnetic flux of varying with a rotational position of a rotor,
   a stator having a gap for installing said magnetic sensitive element, an electrical conductor for transmitting an output signal of said magnetic sensitive element, a pre-molded resin member for fixing said stator including said magnetic sensitive element and said electrical conductors together, an elastic member for enclosing said magnetic sensitive element, and a resin molded member for enclosing said pre-molded resin member and said elastic member enclosed magnetic sensitive element together.

3. A noncontact rotation angle sensor according to claim 2, wherein said elastic member is softer than both of said resin molded member and said pre-molded resin member.

4. A noncontact rotation angle sensor according to claim 3, wherein said elastic member is a soft epoxy resin or a gel resin of filling a gap around said magnetic sensitive element, or rubber member covering said magnetic sensitive element.

5. A noncontact rotation angle sensor according to claim 1, wherein said elastic member has, as a main component, a soft epoxy resin, and said resin molded member has, as a main component, a thermoplastic polybutylene terephthalate resin or a thermoplastic polyphenyl sulfide resin.

6. A noncontact rotation angle sensor according to claim 2, wherein said elastic member is a soft epoxy resin as a main component, and said pre-molded resin member and said resin molded member are a thermoplastic polybutylene terephthalate resin or a thermoplastic polyphenyl sulfide resin as a main component.

7. A noncontact rotation angle sensor comprising:

a magnetic sensitive element for sensing a magnetic flux of varying with a rotational position of a rotor, a stator having a gap for installing said magnetic sensitive element, an electrical conductor for transmitting an output signal of said magnetic sensitive element, and a resin melded member for holding said stator including said magnetic sensitive element and said electrical conductors together, wherein a periphery of said magnetic sensitive element is enclosed with an elastic member, and wherein said magnetic sensitive element is one of two magnetic sensitive elements, terminals of said two magnetic sensitive elements are led out from the magnetic sensitive element installing gap of said stator so as to be bent in directions opposite relative to each other, and said bent terminals are connected with the corresponding electrical conductors.

8. A noncontact rotation angle sensor according to claim 1, wherein said magnetic sensitive element is one of two magnetic sensitive elements, and terminals of said two magnetic sensitive elements are led out from the magnetic sensitive element installing gap of said stator so as to be bent in directions opposite relative to each other, said terminals of said magnetic sensitive elements are connected to first ends of the corresponding electrical conductors, said resin molded member is provided with a connector portion formed integrally therewith, and second ends of said electrical conductor constitute external connection terminals which are collectively arranged at said connector portion of said resin molded member.

9. A noncontact rotation angle sensor according to claim 2, wherein said magnetic sensitive element is comprised of two, and terminals of said two magnetic sensitive elements are led out from the magnetic sensitive element installing gap of said stator in such a manner of being bent in the directions opposite relative to each other, said terminals of said magnetic sensitive elements are connected to one ends of the corresponding electrical conductors, the other ends of said electrical conductors are collectively arranged at a connector portion which is formed integrally with said pre-molded resin member, and said resin molded member is integrally formed with a connector covering external connection terminals arranged at said connector portion of said pre-molded resin member.

10. A noncontact rotation angle sensor comprising:

a magnetic sensitive element for sensing a magnetic flux of varying with a rotational position of a rotor, a stator having a gap for installing said magnetic sensitive element, an electrical conductor for transmitting an output signal of said magnetic sensitive element, a pre-molded resin member for fixing said stator including said magnetic sensitive element and said electrical conductors together, an elastic member for enclosing said magnetic sensitive element, and a resin molded member for enclosing said pre-molded resin member and said elastic member enclosed magnetic sensitive element together, wherein said magnetic sensitive element is one of two magnetic sensitive elements, terminals of said two magnetic sensitive elements are led out from the magnetic sensitive element installing gap of said stator so as to be bent in the directions opposite relative to each other, and said bent terminals are connected with the corresponding electrical conductors.

* * * * *